US010963075B2

(12) United States Patent
Togashi

(10) Patent No.: US 10,963,075 B2
(45) Date of Patent: Mar. 30, 2021

(54) INPUT DETECTING DEVICE

(71) Applicant: SHARP KABUSHIKI KAISHA, Sakai (JP)

(72) Inventor: Yasuyuki Togashi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/563,320

(22) Filed: Sep. 6, 2019

(65) Prior Publication Data

US 2020/0089337 A1 Mar. 19, 2020

Related U.S. Application Data

(60) Provisional application No. 62/731,563, filed on Sep. 14, 2018.

(51) Int. Cl.
| | | |
|---|---|---|
| *G06F 3/0362* | (2013.01) | |
| *G06F 3/02* | (2006.01) | |
| *G06F 3/044* | (2006.01) | |
| *H01H 13/14* | (2006.01) | |
| *G02F 1/1333* | (2006.01) | |

(52) U.S. Cl.
CPC ........ *G06F 3/0362* (2013.01); *G02F 1/13338* (2013.01); *G06F 3/0202* (2013.01); *G06F 3/0446* (2019.05); *H01H 13/14* (2013.01); *H01H 2221/01* (2013.01); *H01H 2231/016* (2013.01)

(58) Field of Classification Search
CPC .... G06F 3/0362; G06F 3/0446; G02F 1/0202; H01H 3/14; H01H 2221/01; H01H 2231/016

USPC ........................................................ 345/173
See application file for complete search history.

(56) References Cited

U.S. PATENT DOCUMENTS

| | | | | |
|---|---|---|---|---|
| 6,225,980 | B1* | 5/2001 | Weiss | G06F 3/0362 345/156 |
| 9,753,483 | B1* | 9/2017 | Thomas | F41G 1/38 |
| 2009/0079712 | A1* | 3/2009 | Levin | G05G 9/047 345/184 |
| 2013/0100042 | A1* | 4/2013 | Kincaid | G06F 3/04847 345/173 |
| 2017/0052617 | A1* | 2/2017 | Okuzumi | G05G 1/02 |
| 2018/0141180 | A1* | 5/2018 | Okamura | G05B 19/00 |

FOREIGN PATENT DOCUMENTS

WO     2015/174092 A1    11/2015

* cited by examiner

*Primary Examiner* — Kent W Chang
*Assistant Examiner* — Sujt Shah
(74) *Attorney, Agent, or Firm* — ScienBiziP, P.C.

(57) ABSTRACT

An input detecting device includes: an input receiver configured to receive position input; a position detector included in the input receiver and configured to detect at least a position of the position input; a rotary portion rotatably attached to the input receiver and configured to move between a standby position spaced apart from the input receiver and an advanced position closer than the standby position to the input receiver; a rotation detectable portion configured to be rotated relative to the input receiver together with the rotary portion and whose position is detectable by the position detector; and a push detectable portion whose position is detectable by the position detector when the rotary portion is positioned at one of the standby position and the advanced position.

13 Claims, 22 Drawing Sheets

INPUT DETECTING DEVICE

CROSS REFERENCE TO RELATED APPLICATION

This application claims priority from U.S. provisional patent application No. 62/731,563 filed on Sep. 14, 2018. The entire contents of the priority application are incorporated herein by reference.

The present invention relates to an input detecting device.

BACKGROUND

An example of a known input detecting device including a touch panel is described in WO2015/174092. The input detecting device described in WO2015/174092 includes an operation knob attached to a touch display panel. The operation knob includes an operation unit and a transmitting unit. The transmitting unit is located away from a surface of the touch display panel and transmits the user's action on the operation unit to the touch display panel.

The operation knob of the input detecting device described in WO2015/174092 includes a button operation unit located at the center of the operation knob and configured to be pushed down and a dial operation unit located around the button operation unit and configured to be rotated. This configuration requires, when the user performs the rotation operation and the pushing operation in a row, the user to release the dial operation unit and then hold the button operation unit, resulting in poor operability.

SUMMARY

The present invention was made in view of the above-described circumstance. An object is to improve operability.

(1) An embodiment of the present invention is an input detecting device including an input receiver configured to receive position input, a position detector included in the input receiver and configured to detect at least a position of the position input, a rotary portion rotatably attached to the input receiver and configured to move between a standby position spaced apart from the input receiver and an advanced position closer than the standby position to the input receiver, a rotation detectable portion configured to be rotated relative to the input receiver together with the rotary portion and whose position is detectable by the position detector, and a push detectable portion whose position is detectable by the position detector when the rotary portion is positioned at one of the standby position and the advanced position.

(2) Furthermore, an embodiment of the invention is an input detecting device in which, in addition to the above configuration (1), the position detector includes a capacitive touch panel pattern, the rotary portion is conductive, the rotation detectable portion is conductive and electrically connected to the rotary portion, and the push detectable portion is conductive and electrically connected to the rotary portion when the rotary portion is positioned at one of the standby position and the advanced position.

(3) Furthermore, an embodiment of the present invention is an input detecting device including a second rotary portion configured to be rotated together with the rotary portion, in addition to the above configuration (2). The second rotary portion is attached to the rotary portion without inhibiting the movement of the rotary portion in a moving direction of the rotary portion toward and away from the input receiver. The rotation detectable portion is included in the second rotary portion.

(4) Furthermore, an embodiment of the present invention is an input detecting device in which, in addition to the above configuration (3), the rotation detectable portion has a portion sticking out from the second rotary portion toward the input receiver, and the second rotary portion has a protrusion projecting toward the input receiver.

(5) Furthermore, an embodiment of the present invention is an input detecting device including, in addition to the above configuration (3) or (4), a biasing member located between the rotary portion and the second rotary portion and configured to elastically bias the rotary portion toward the standby position.

(6) Furthermore, an embodiment of the present invention is an input detecting device in which, in addition to any one of the above configurations (3) to (5), at least one of the rotary portion and the push detectable portion has a push detection elastic contact portion configured to be in elastic contact with a counterpart when the rotary portion is positioned at one of the standby position and the advanced position, and the push detectable portion is included in the second rotary portion.

(7) Furthermore, an embodiment of the present invention is an input detecting device in which, in addition to the above configuration (6), the push detection elastic contact portion is out of contact with the counterpart when the rotary portion is positioned at the standby position and is in contact with the counterpart when the rotary portion is positioned at the advanced position.

(8) Furthermore, an embodiment of the present invention is an input detecting device in which, in addition to the above configuration (6), the push detection elastic contact portion is out of contact with the counterpart when the rotary portion is positioned at the advanced position and is in contact with the counterpart when the rotary portion is positioned at the standby position.

(9) Furthermore, an embodiment of the present invention is an input detecting device in which, in addition to any one of the configurations (3) to (5), the push detectable portion is included in the rotary portion.

(10) Furthermore, an embodiment of the present invention is an input detecting device in which, in addition to any one of the configurations (3) to (9), at least one of the rotary portion and the rotation detectable portion has a rotation detection elastic contact portion configured to be in elastic contact with a counterpart.

(11) Furthermore, an embodiment of the present invention is an input detecting device in which, in addition to any one of the configurations (2) to (10), the push detectable portion and the rotation detectable portion each have a detectable surface facing the input receiver and subjected to position detection by the position detector, and the detectable surface of the push detectable portion and the detectable surface of the rotation detectable portion have different sizes.

(12) Furthermore, an embodiment of the present invention is an input detecting device in which, in addition to the above configuration (11), the push detectable portion and the rotation detectable portion differ in number of detectable surfaces.

(13) Furthermore, an embodiment of the present invention is an input detecting device including, in addition to any one of the configurations (1) to (12), a stationary member fixed to the input receiver and to which the rotary portion is rotatably attached.

(14) Furthermore, an embodiment of the present invention is an input detecting device including, in addition to the above configuration (13), a latch having a supporting portion fixed to the stationary member and an arm configured to be elastically deformed with the supporting portion as a fulcrum and in contact with an inner circumferential surface of the rotary portion. The inner circumferential surface of the rotary portion has recesses and protrusions alternately arranged in a rotation direction of the rotary portion.

(15) Furthermore, an embodiment of the present invention is an input detecting device in which, in addition to the configuration in the above (14), the stationary member includes a first stationary portion located closer than the latch to the input receiver and a second stationary portion sandwiching the latch with the first stationary portion.

The present invention has improved operability.

DETAILED DESCRIPTION

First Embodiment

Figure 1:
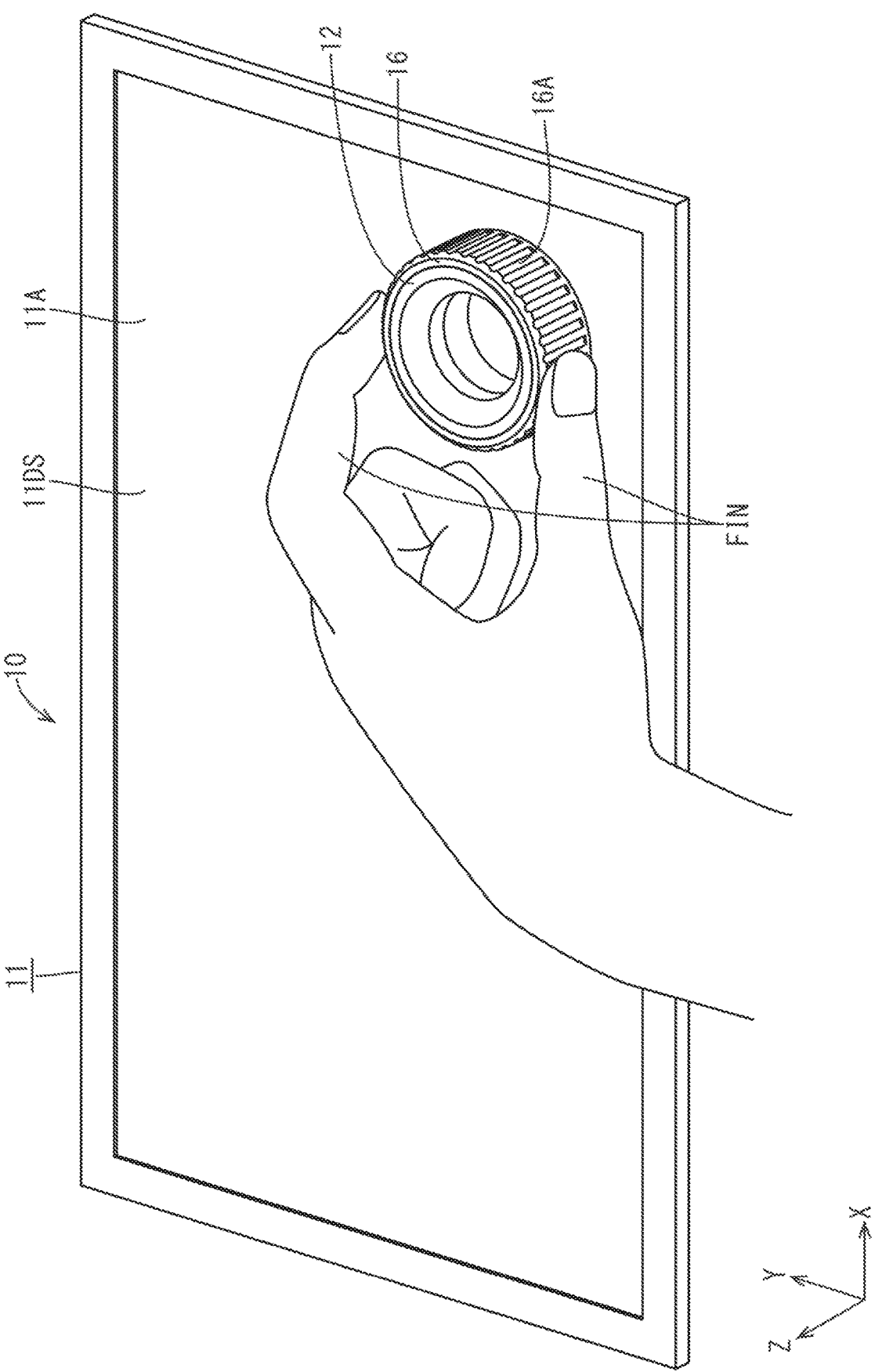
FIG. 1 is a perspective view of an input detecting device according to a first embodiment of the invention.

A first embodiment of the invention is described with reference to FIGS. 1 to 15. In this embodiment, an input detecting device 10 is described. The X axis, the Y axis, and the Z axis are indicated in some of the drawings, and each of the axes indicates the same direction in the respective drawings. Furthermore, the up and down direction is based on FIGS. 6, 7, 9, 10, 11, 13, and 14. The upper side in the drawings is the front side and the lower side in the drawings is the rear side.

As illustrated in FIG. 1, the input detecting device 10 includes at least a liquid crystal display device (input receiver) 11 configured to display an image and receive a touching action (position input) by a user and a dial 12 attached to the liquid crystal display device 11. The liquid crystal display device 11 has a touch panel function (position input function) of detecting an input position inputted (touched) by a user in addition to a display function of displaying an image. In this embodiment, the input detecting device 10 in a navigation system mounted in a passenger car is described as an example. However, the application of the input detecting device 10 is not limited to a navigation system mounted in a passenger car.

As illustrated in FIG. 1, the liquid crystal display device 11 includes at least a liquid crystal panel (display panel) (not illustrated), a cover glass (cover panel, panel protector) 11A disposed over the front surface of the liquid crystal panel, and a backlight device configured to apply light to the liquid crystal panel. The liquid crystal panel is a known liquid crystal panel configured to display an image by using light from the backlight device and includes a liquid crystal layer sealed between two substrates. One of the substrates of the liquid crystal panel on the front side is a CF substrate (counter substrate). The CF substrate has a color filter having R (red), G (green), and B (blue) coloring portions arranged in a predetermined arrangement and light blocking portions (black matrix) separating the coloring portions adjacent to each other and further a component such as an alignment film. In contrast, one of the substrates of the liquid crystal panel on the rear side is an array substrate (TFT substrate). The array substrate has switching devices (TFTs, for example) connected to the source lines and the gate lines, which are disposed perpendicular to each other, pixel electrodes connected to the switching devices, and a component such as an alignment film.

As illustrated in FIG. 1, the cover glass 11A and the liquid crystal panel have a horizontally long rectangular shape. The long-side direction of the cover glass 11A and the liquid crystal panel matches the X axis direction in the drawings, the short-side direction of the cover glass 11A and the liquid crystal panel matches the Y axis direction in the drawings, and the thickness direction of the cover glass 11A and the liquid crystal panel (direction normal to the display surface 11DS) matches the Z axis direction in the drawings. The cover glass 11A covers and protects substantially the entire front surface of the liquid crystal panel. The cover glass 11A is formed of substantially transparent and high light-transmissive glass and has a plate-like shape. The cover glass 11A is preferably formed of a toughened glass. A preferable example of the toughened glass includes, but is not limited to, chemically toughened glass having a chemically toughened top layer obtained by performing a chemical treatment on a surface of a plate-like glass substrate.

Figure 2:
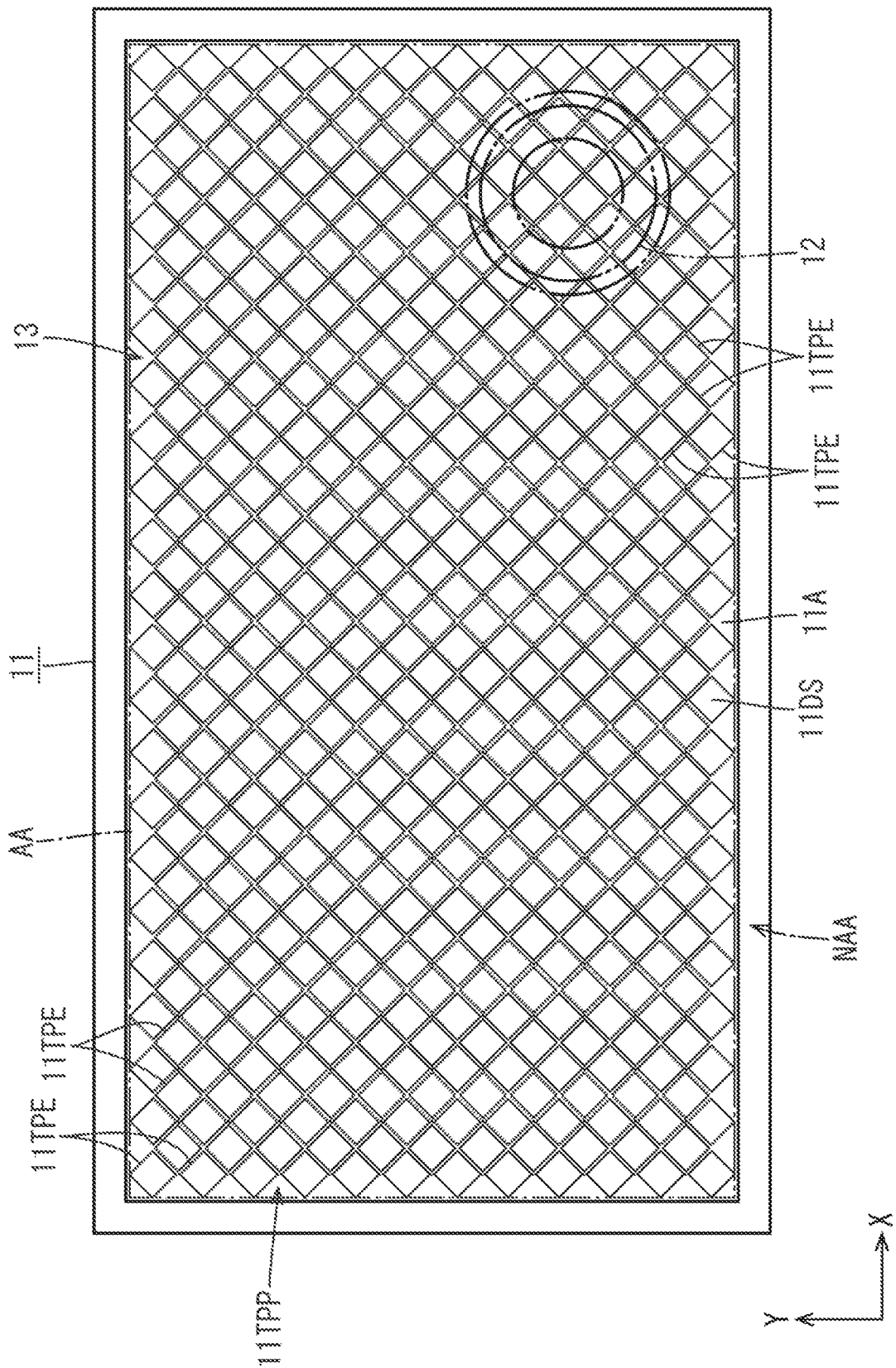
FIG. 2 is a plan view of the input detecting device.

As illustrated in FIG. 2, the liquid crystal display device 11 has a display surface 11DS having a display area (active area) AA capable of displaying an image and a frame-like non-display area (non-active area) NAA surrounding the display area AA. In FIG. 2, a one-dot chain line indicates an outline of the display area AA, and the area outside the one-dot chain line is the non-display area NAA. The liquid crystal display device 11 includes a position detector 13 configured to detect an input position touched by the user. In FIG. 2, the dial 12 is indicated by a two-dot chain line to make the position detector 13 stand out. The position detector 13 includes a projected capacitive touch panel pattern 11TP. The touch panel pattern 11TP is built in the cover glass 11A or the liquid crystal panel. The touch panel pattern 11TP in the cover glass 11A is called an "out-cell touch panel pattern". The touch panel pattern 11TP in the liquid crystal panel is called an "in-cell touch panel pattern". The touch panel pattern 11TP is a self-capacitive touch panel pattern. The touch panel pattern 11TP includes at least multiple touch electrodes (position detecting electrodes) 11TPE arranged in a matrix in the display area AA. The display area AA substantially matches the touch area (position detectable area) where input positions are detectable. The non-display area NAA substantially matches the non-touch area (position non-detectable area) where input positions are undetectable. When the user touches the display area AA with a finger (input body) FIN based on the image in the display area AA, capacitance is generated between the finger FIN, which is a conductor, and the touch electrode 11TPE (FIG. 1). The capacitance detected at the touch electrode 11TPE near the finger FIN changes as the finger FIN approaches, and the touch electrode 11TPE becomes distinguishable from the other touch electrodes 11TPE away from the finger FIN, enabling the detection of the input position. The touch panel pattern 11TP is connected to a control board (not illustrated) through a flexible board (not illustrated), for example. A signal outputted from the touch panel pattern 11TP is detected by a touch detecting circuit of the control board.

Next, the dial 12 is described. As illustrated in FIG. 1, the dial 12 protrudes frontward from the display surface 11DS of the liquid crystal display device 11 such that the user can hold the dial 12 between the fingers FIN for rotation. The dial 12 includes a rotation detectable portion 14 whose position is detectable by the position detector 13 (see FIG. 6). Information relating to the rotation state, such as the number of rotations of the dial 12, the angle of rotation, and the speed of rotation is obtained by detecting the position of the rotation detectable portion 14 by the position detector 13 after the dial 12 is rotated. With this configuration, an image corresponding to the rotation state of the dial 12 is displayed, for example. Hereinafter, the dial 12 is described in detail.

Figure 3:
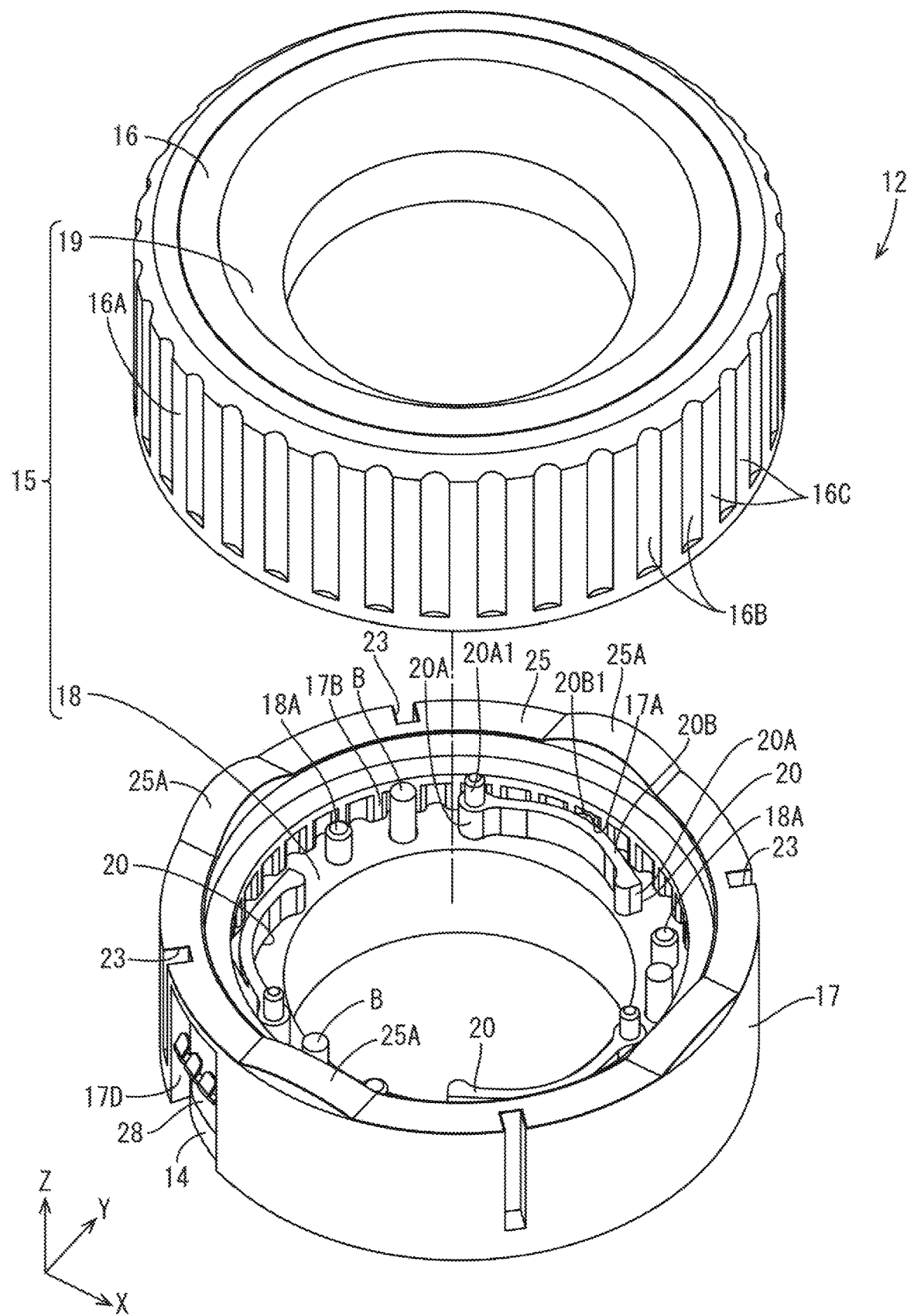
FIG. 3 is an exploded perspective view of a dial.

As illustrated in FIG. 3, the dial 12 has an annular overall shape and has an opening extending up and down in the Z axis direction (direction along the rotation axis) at the middle. The dial 12 includes at least a stationary member 15 fixed to the liquid crystal display device 11, a rotary portion 16 rotatably attached to the stationary member 15, and a second rotary portion 17 attached to the stationary member 15 and the rotary portion 16. The second rotary portion 17 is rotatable together with the rotary portion 16. The second rotary portion 17 includes the rotation detectable portion 14. The rotary portion 16, the second rotary portion 17, and the rotation detectable portion 14 are all rotatable relative to the stationary member 15 and the liquid crystal display device 11.

Figure 4:
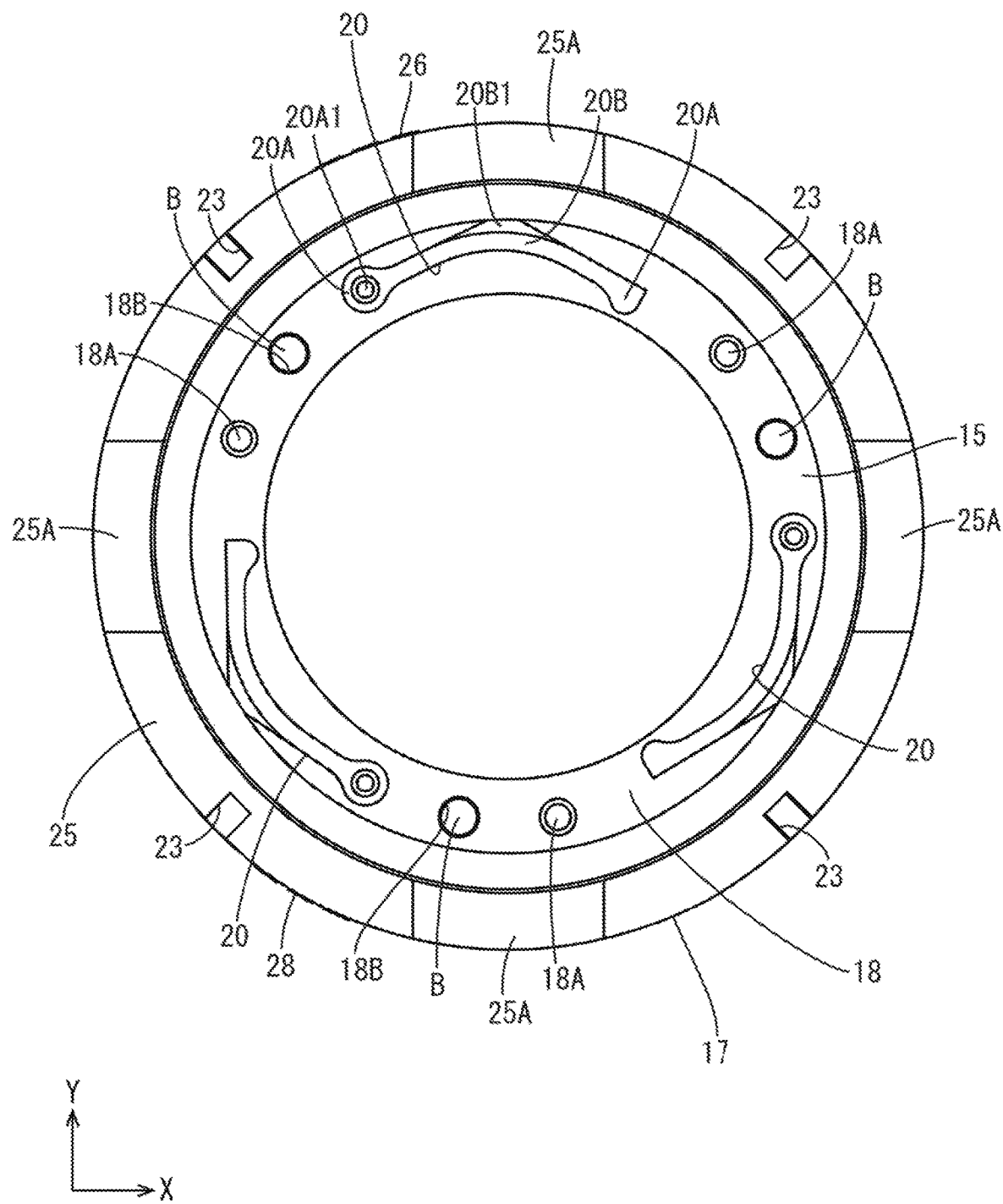
FIG. 4 is a plan view of the dial without a second stationary portion and a rotary portion.
Figure 5:
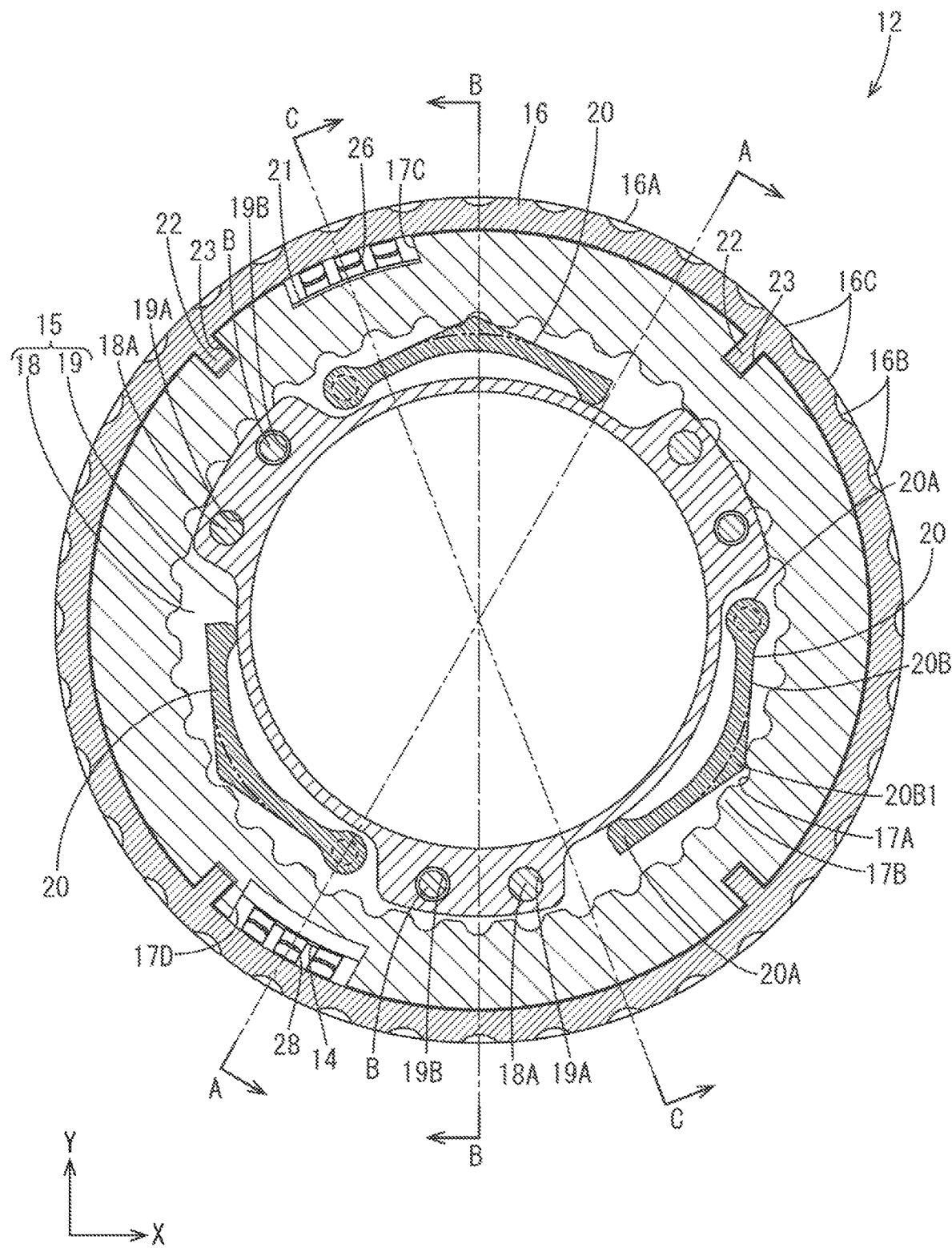
FIG. 5 is a planar cross-sectional view of the dial.

As illustrated in FIG. 3, the stationary member 15 has a substantially cylindrical overall shape and includes a first stationary portion 18 directly fixed to the liquid crystal display device 11 and a second stationary portion 19 located on the front side of the first stationary portion 18 in the Z axis direction and attached to the first stationary portion 18. The first stationary portion 18 and the second stationary portion 19 are not conductive and are formed of a synthetic resin, for example. The first stationary portion 18 and the second stationary portion 19 are concentrically arranged. The inner circumferential surfaces of the first and second stationary portions 18 and 19 are substantially flush with each other and the outer circumferential surfaces thereof are substantially flush with each other except some areas. The first stationary portion 18 is fixed to the display surface 11DS of the liquid crystal display device 11 at the rear end surface with an adhesive, for example. As illustrated in FIGS. 3 and 4, positioning protrusions 18A protrude frontward in the Z axis direction from the front-end surface of the first stationary portion 18. As illustrated in FIGS. 3 and 5, the second stationary portion 19 is fixed to the first stationary portion 18 with the rear end surface thereof facing the front-end surface of the first stationary portion 18. The rear end surface of the second stationary portion 19 has positioning recesses 19A into which the positioning protrusions 18A are fitted. The first stationary portion 18 and the second stationary portion 19 are positionally fixed by the positioning protrusions 18A and the positioning recesses 19A. Three positioning protrusions 18A are disposed at an angle interval of about 120 degrees in a rotation direction of the dial 12 and three positioning recesses 19A are disposed at an angle interval of about 120 degrees in the rotation direction of the dial 12. The first stationary portion 18 and the second stationary portion 19, respectively, include screw holes 18B and screw holes 19B communicating with the screw holes 18B. The first and second stationary portions 18 and 19 are kept attached to each other by screws (fixing members) B inserted into the screw holes 18B and 19B. Three screw holes 18B, three screw holes 19B, and three screws B are disposed at positions spaced apart from the positions of the positioning protrusions 18A and the positioning recesses 19A at a substantially regular angle interval in the rotation direction of the dial 12. The second stationary portion 19 has cutouts in a surface facing the first stationary portion 18 at positions not overlapping the formation regions of the positioning recesses 19A and the screw holes 19B. Latches, which are described next, are housed in the cutouts.

Figure 6:
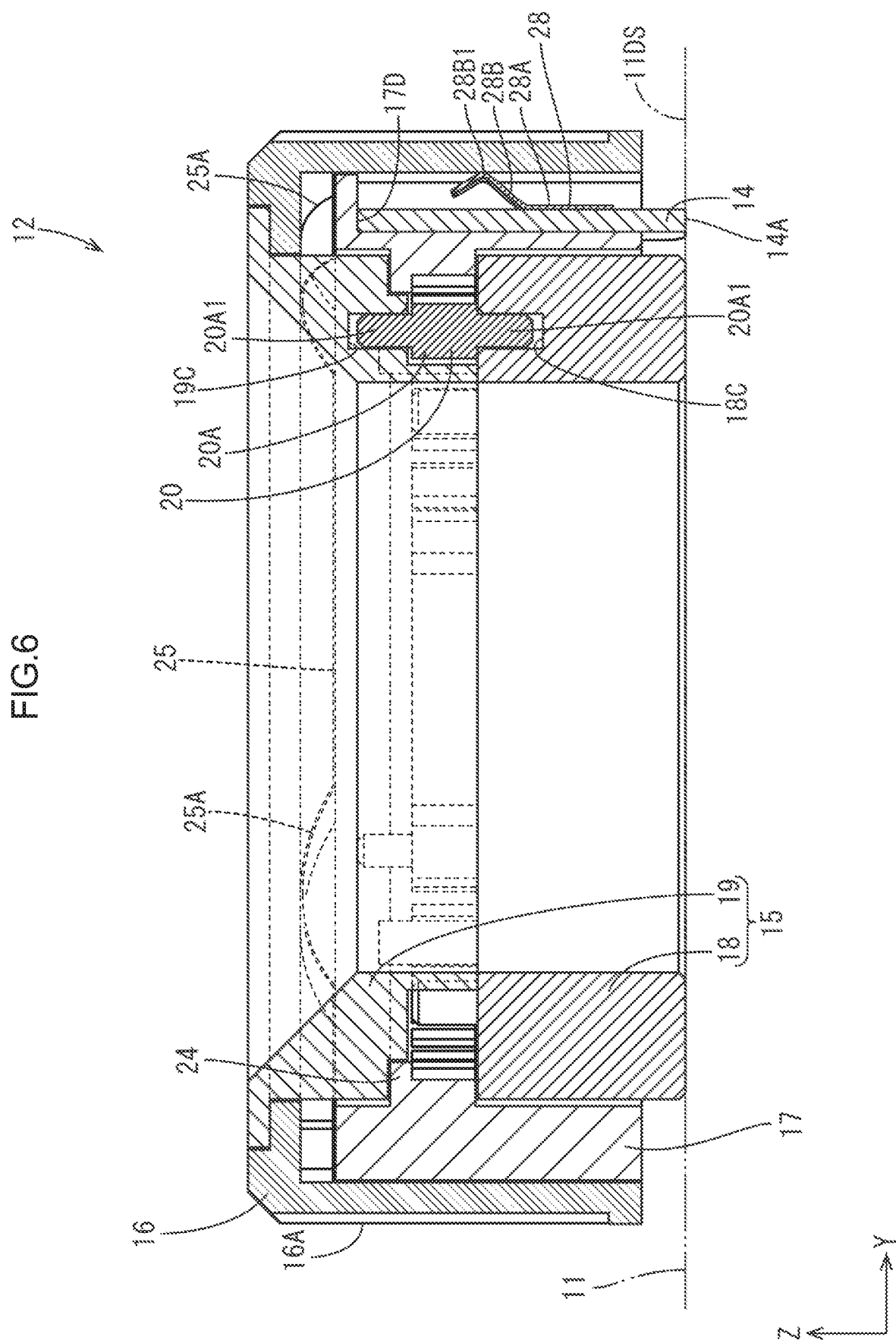
FIG. 6 is a cross-sectional view of the dial positioned at the standby position and taken along line A-A in FIG. 5.

As illustrated in FIGS. 3 and 5, latches 20 are disposed on the stationary member 15 having the above-described configuration. The latches 20, which are fixed to the stationary member 15, make clicky sound during rotation of the rotary portion 16. Specifically described, the latches 20 are sandwiched and held between the first stationary portion 18 and the second stationary portion 19 in the Z axis direction. The latches 20 each have two supporting portions 20A fixed to the stationary member 15 and a both-ends supported arm 20B extending from one of the supporting portions 20A to the other. The two supporting portions 20A each have at least one latch holding protrusion 20A1 protruding in the Z axis direction. One of the two supporting portions 20A has two latch holding protrusions 20A1 protruding to the front side and protruding to the rear side as illustrated in FIG. 6. The other of the two supporting portions 20A has only one latch holding protrusion 20A1 protruding to the rear side. The first and second stationary portions 18 and 19, which sandwich the latches 20 therebetween, have latch holding recesses 18C and 19C that receive the latch holding protrusions 20A1 in the surface facing the latches 20. When the latch holding protrusions 20A1 are fitted into the latch holding recesses 18C and 19C, the latches 20 are held relative to the stationary member 15. As illustrated in FIG. 5, the arm 20B has a V-like shape in plan view and is elastically deformable with the two supporting portions 20A as fulcrums. The movement direction of the arm 20B during the elastic deformation substantially matches the radial direction of the dial 12 (rotary portions 16 and 17). The arm 20B has a contact portion 20B1 in contact with the inner circumferential surface of the second rotary portion 17. The middle portion of the arm 20B located at the outermost side in the radial direction is the contact portion 20B1 to be in contact with the inner circumferential surface of the second rotary portion 16. The second rotary portion 17 has inner circumferential recesses 17A and inner circumferential protrusions 17B alternately arranged in the rotation direction (circumferential direction) of the rotary portion 16. This will be described in detail later. In this configuration, during rotation of the rotary portion 16, the arm 20B slidably comes in contact with the inner circumferential recesses 17A and the inner circumferential protrusions 17B, which are alternately arranged in the rotation direction, and thus the arm 20B is repeatedly elastically deformed and restored with the two supporting portions 20A as fulcrums. The arm 20B makes clicky sound as the arm 20B moves. The time interval of the clicky sound becomes shorter as the rotation speed increases.

As illustrated in FIGS. 3 and 5, the rotary portion 16 and the second rotary portion 17 each have a substantially cylindrical shape (annular shape) having a larger diameter than the stationary member 15 and surrounds the entire perimeter of the stationary member 15. The outer circumferential surface of the rotary portion 16 is an operation surface 16A that is held by the user for rotation. The operation surface 16A is the outermost surface of the dial 12. The second rotary portion 17 is located between the stationary member 15 on the inner side and the rotary portion 16 on the outer side in the radial direction of the dial 12. The rotary portion 16 is conductive and is formed of metal (conductive material), for example. Thus, when the user holds the operation surface 16A of the rotary portion 16 between the fingers FIN, the rotary portion 16 and the fingers FIN have the same potential. The second rotary portion 17 is not conductive and is formed of a synthetic resin, for example. The inner surface (facing the stationary member 15) of the second rotary portion 17 has multiple inner circumferential recesses (recesses) 17A and inner circumferential protrusions (protrusions) 17B alternately arranged in the rotation direction. The inner circumferential recesses 17A is capable of receiving the contact portion 20B1 of the arm 20B. The inner circumferential protrusions 17B protrude from the inner circumferential recesses 17A in a radial direction of the rotary portion 16 toward the center. In this configuration, when the rotary portion 16 is rotated with the contact portion 20B1 being in the inner circumferential recess 17A, the arm 20B is elastically deformed as the contact portion 20B1 goes up onto the inner circumferential protrusion 17B. Then, the arm 20B is elastically restored as the contact portion 20B1 goes over the inner circumferential protrusion 17B to the adjacent inner circumferential recess 17A. The operation surface 16A of the rotary portion 16 has multiple outer circumferential recesses 16B and multiple outer circumferential protrusions 16C alternately arranged in the rotation direction. The outer circumferential recesses 16B and the outer circumferential protrusions 16C function as slip resistances of the user's fingers FIN holding the operation surface 16A.

Figure 7:
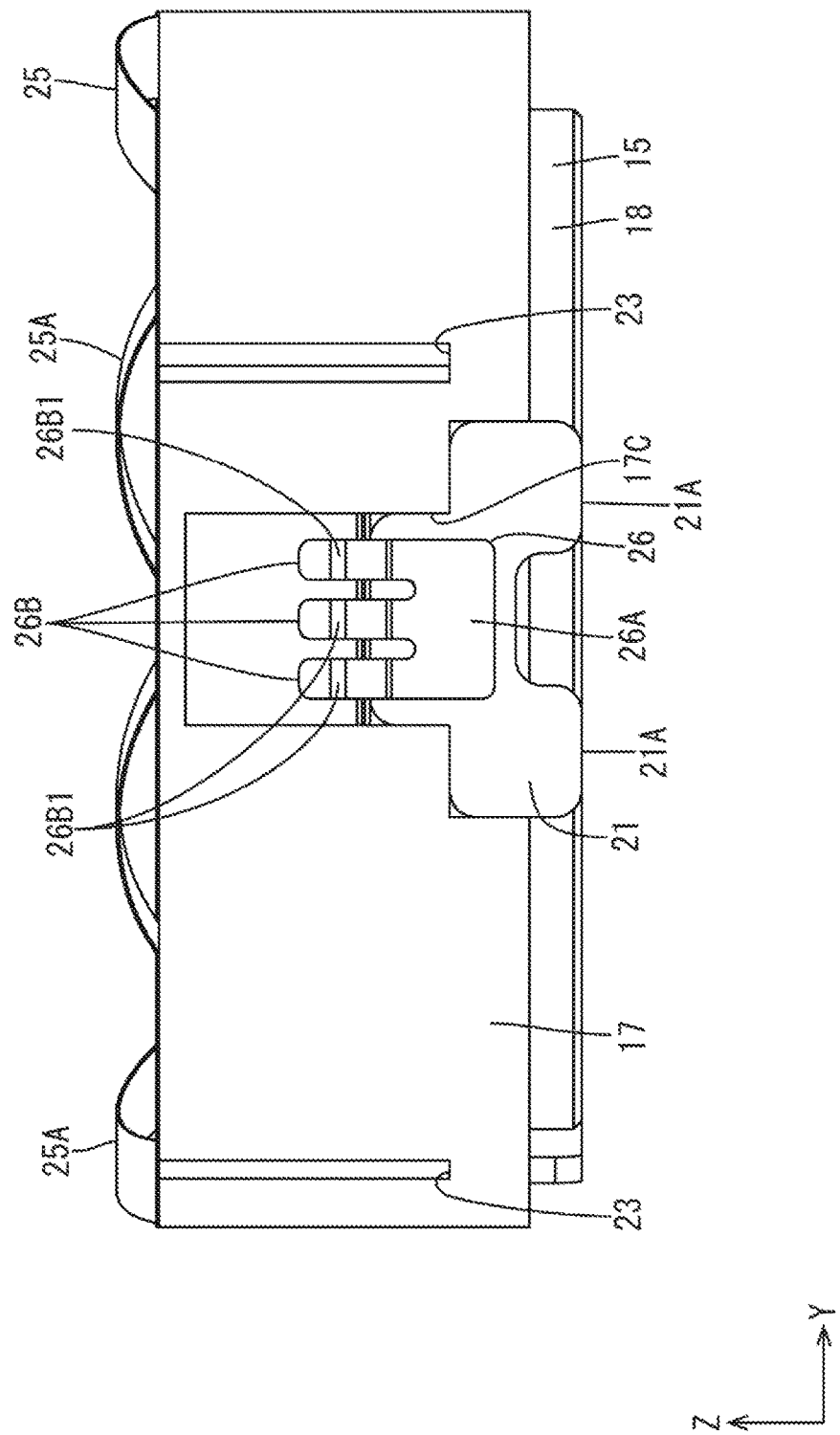
FIG. 7 is a side view of the dial without the rotary portion and has a push detectable portion at the front.
Figure 9:
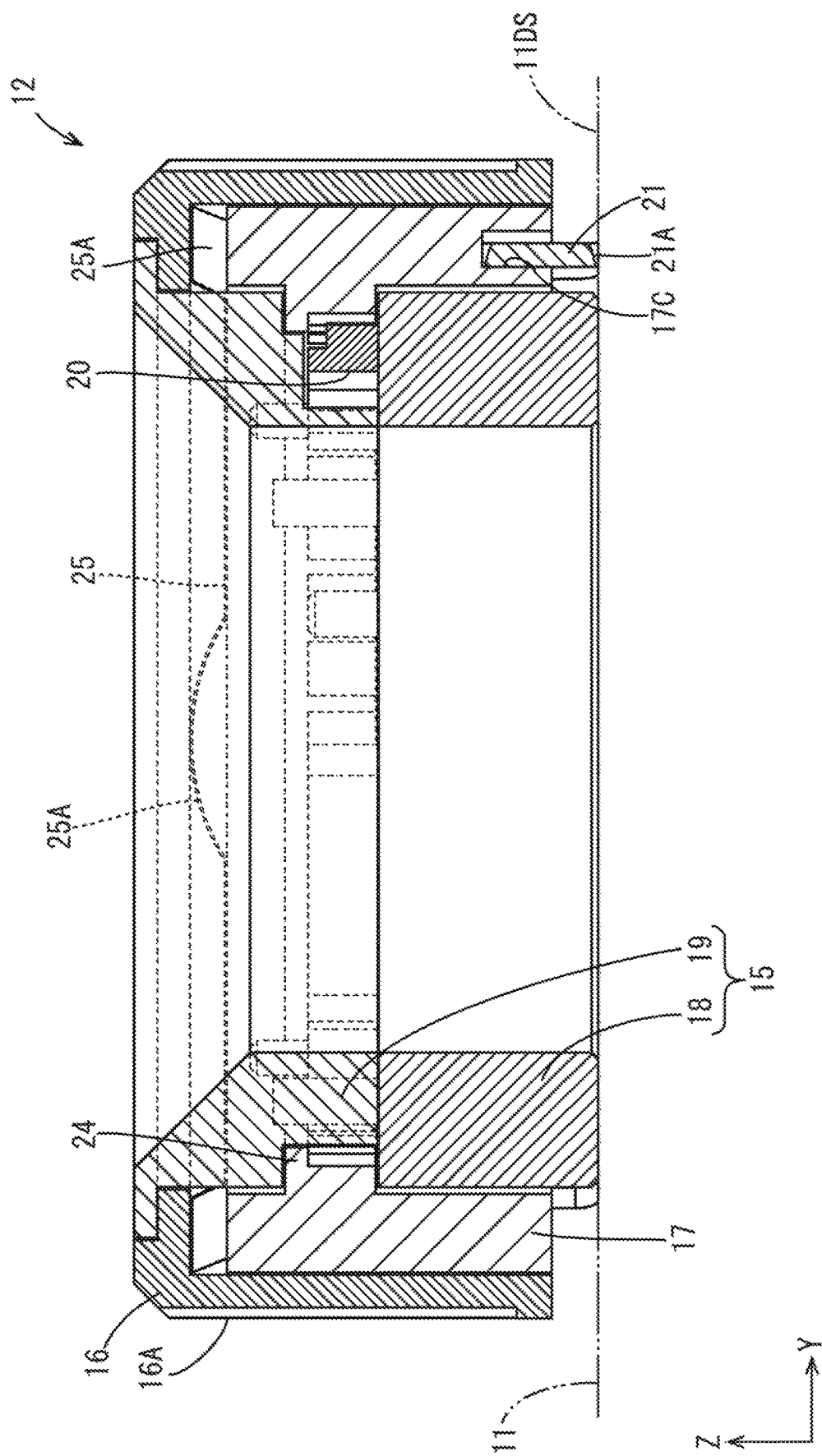
FIG. 9 is a cross-sectional view of the dial having the rotary portion at the standby position and taken along line B-B in FIG. 5.
Figure 13:
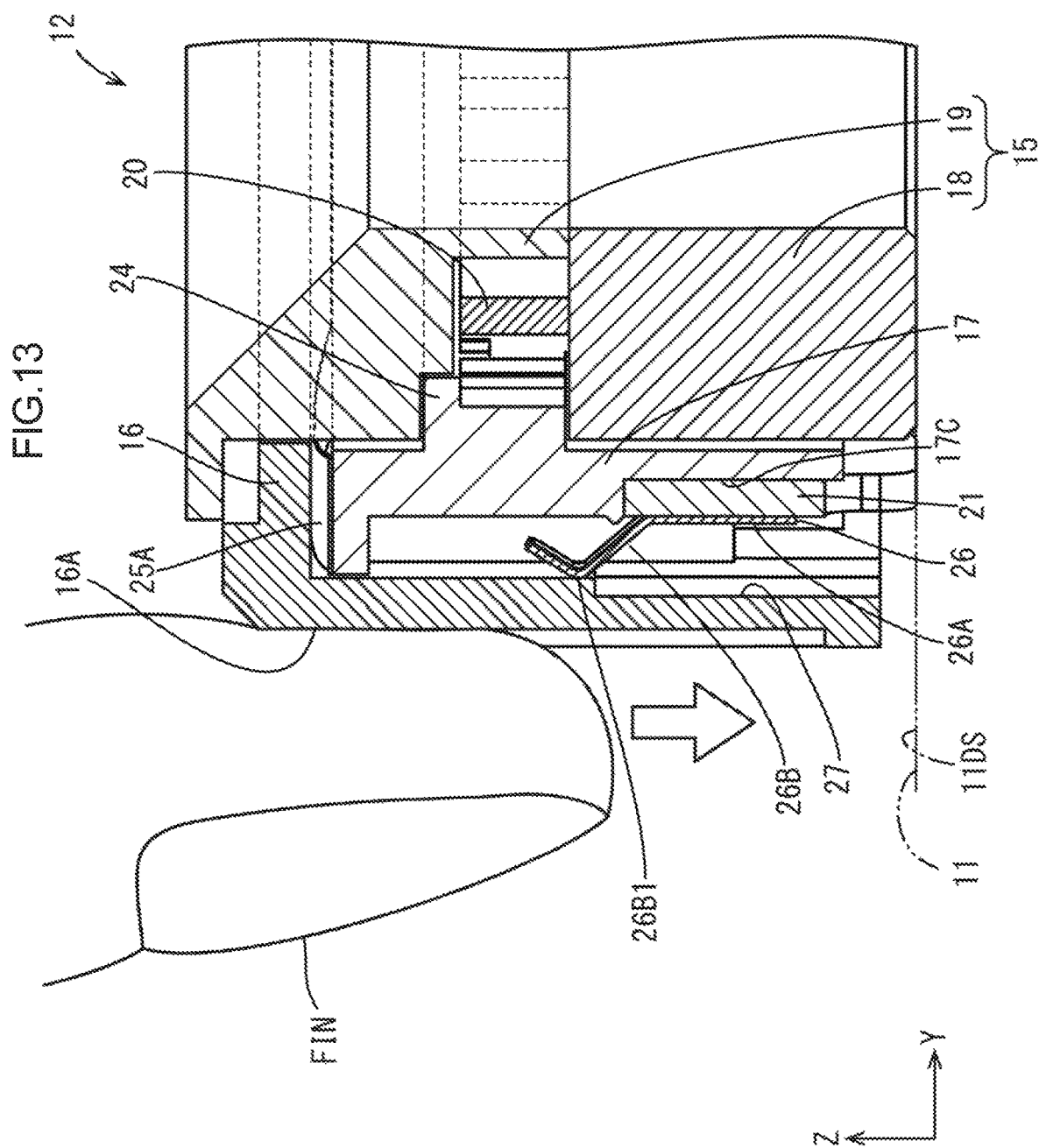
FIG. 13 is a cross-sectional view of the dial having the rotary portion at the advanced position and taken along line C-C in FIG. 5.
Figure 14:
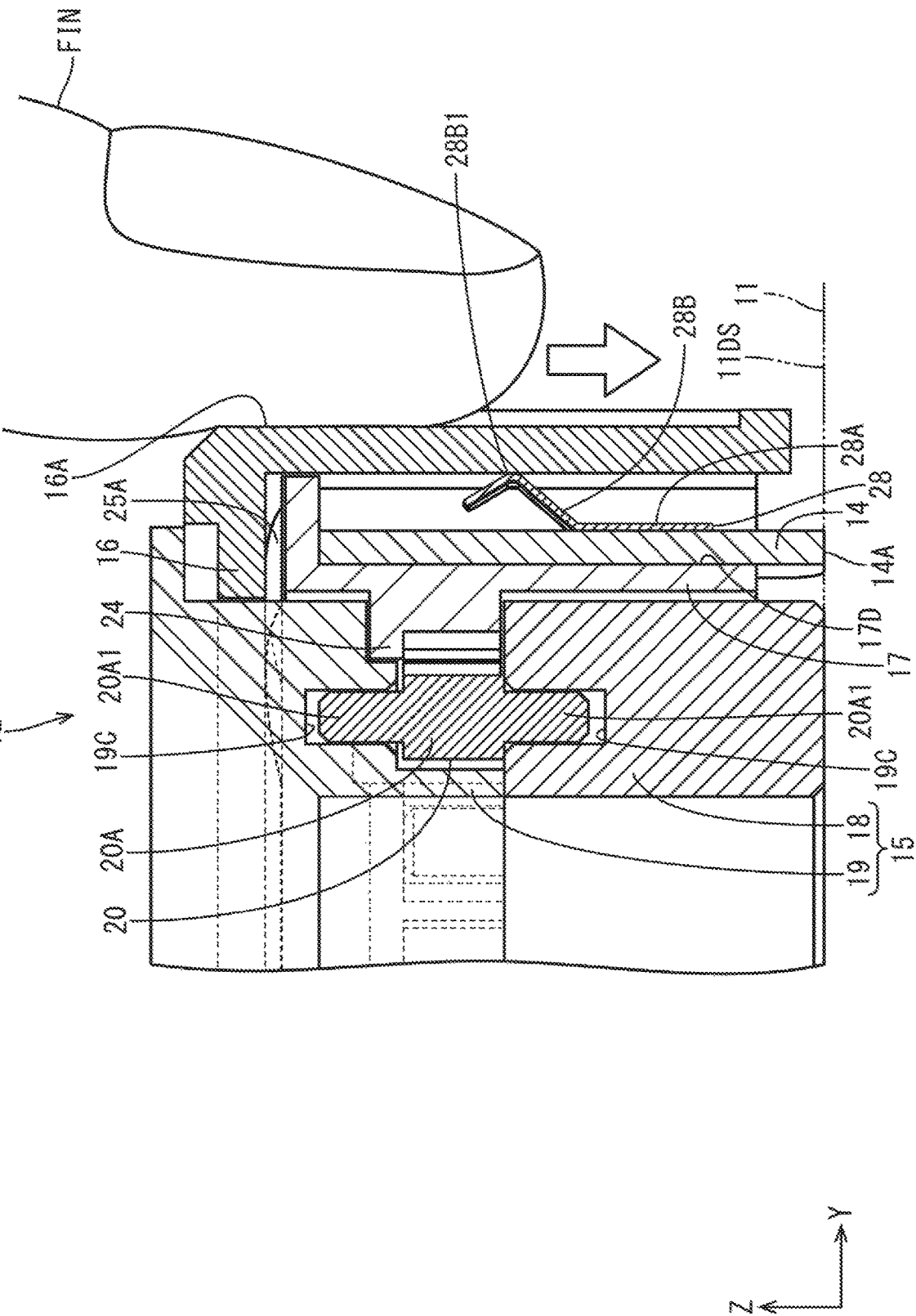
FIG. 14 is a cross-sectional view of the dial having the rotary portion at the advanced position and taken along line A-A in FIG. 5.

The dial 12 of the embodiment is attached such that the rotary portion 16 is movable between a standby position spaced apart from the liquid crystal display device 11 in the Z axis direction (moving direction), which is illustrated in FIGS. 6 and 9, and advanced position (push-down position) closer than the standby position to the liquid crystal display device 11, which is illustrated in FIGS. 13 and 14. This configuration not only allows the user to rotate the rotary portion 16 of the dial 12 about the rotation axis extending in the Z axis direction (rotation action) but also allows the user to push the rotary portion 16 toward the liquid crystal display device 11 in the Z axis direction (pushing action). As illustrated in FIG. 7, the dial 12 includes a push detectable portion 21 whose position is detectable by the position detector 13 when the rotary portion 16 is positioned at one of the standby position and the advanced position. In this configuration, when the user pushes the rotary portion 16 toward the liquid crystal display device 11, the rotary portion 16 at the standby position spaced apart from the liquid crystal display device 11 moves toward the advanced position closer than the standby position to the liquid crystal display device 11. The position of the push detectable portion 21 is detectable by the position detector 13 when the rotary portion 16 is positioned at one of the standby position and the advanced position. Thus, when the rotary portion 16 at the standby position is pushed to the advanced position, the detection state of the push detectable portion 21 obtained by the position detector 13 changes. Based on the change, it is determined whether the pushing action was performed, and thus an image corresponding to the pushing action is displayed, for example. As described above, when the user performs the rotation action and the pushing action in a row, the user does not need to release his/her fingers from the rotary portion 16. This configuration has high operability.

The relationship between the rotary portion 16, which allows the above-described pushing action, and the second rotary portion 17 is described in detail. As illustrated in FIGS. 5 and 6, the second rotary portion 17 is attached to the rotary portion 16 such that the second rotary portion 17 is rotatable together with the rotary portion 16 and the rotary portion 16 is movable relative to the second rotary portion 17 in the Z axis direction. The rotary portion 16 has rails 22 protruding from the inner circumferential surface (surface facing the second rotary portion 17) to the inner side in the radial direction and extending in the Z axis direction. The second rotary portion 17 has grooves 23 dented from the outer circumferential surface (surface facing to the rotary portion 16) to the inner side in the radial direction and extending in the Z axis direction. The grooves 23 receive the rails 22. In this configuration, when the rotary portion 16 is rotated, the rail 22 is caught by the inner edge of the groove 23. This prevents the rotary portion 16 from rotating relative to the second rotary portion 17. Thus, when the rotary portion 16 is rotated, the second rotary portion 17 is rotated together with the rotary portion 16. In contrast, when the rotary portion 16 is pushed, the rails 22 slidably come in contact with the inner surfaces of the grooves 23, and thus the rotary portion 16 is guided by the grooves 23 relative to the second rotary portion 17 in the Z axis direction. With this configuration, when the rotary portion 16 is pushed in the Z axis direction toward the liquid crystal display device 11, the position of the second rotary portion 17 in the Z axis direction is unchanged. Furthermore, the second rotary portion 17 is attached to the stationary member 15 such that the second rotary portion 17 is rotatable relative to the stationary member 15 and is unmovable in the Z axis direction. The second rotary portion 17 has a rotation guide 24 protruding from the inner circumferential surface (surface facing the stationary member 15) to the inner side in the radial direction. The rotation guide 24 is sandwiched between the first stationary portion 18 and the second stationary portion 19 of the stationary member 15 to allow the second rotary portion 17 to rotate together with the rotary portion 16.

As illustrated in FIGS. 4 and 6, the dial 12 includes a biasing member 25 located between the rotary portion 16 and the second rotary portion 17 in the Z axis direction. The rotary portion 16 is in contact with the radial outer surface of the second rotary portion 17 and is located on the front side of the second rotary portion 17 (side away from the liquid crystal display device 11) with a space from the second rotary portion 17 in the Z axis direction. The biasing member 25 is disposed in the space between the first rotary portion 16 and the second rotary portion 17 in the Z axis direction. The biasing member 25 is formed of a leaf spring having a closed annular shape in plan view. The biasing member 25 has a large planar portion in contact with the front surface of the second rotary portion 17 and four frontward protruding spring portions 25A at an angle interval of about 90 degrees in the circumferential direction. The spring portions 25A, which are supported at both ends by the planar portion of the biasing member 25, are elastically deformable and elastically deformed in the Z axis direction. The spring portions 25A are always in contact with the rotary portion 16, and thus when the rotary portion 16 at the standby position is pushed toward the rear side in the Z axis direction, the spring portions 25A store the biasing force (spring force, resilient force) while being elastically deformed. The biasing force of the spring portions 25A is used to move the rotary portion 16 in the Z axis direction toward the standby position. Thus, when the user releases the finger FIN from the rotary portion 16 after the pushing action, the biasing force stored in the spring portions 25A is released. This allows the rotary portion 16 at the advanced position to automatically move back to the standby position. This eliminates the need for the user to move the rotary portion 16 at the advanced position back to the standby position, resulting in higher operability.

Figure 8:
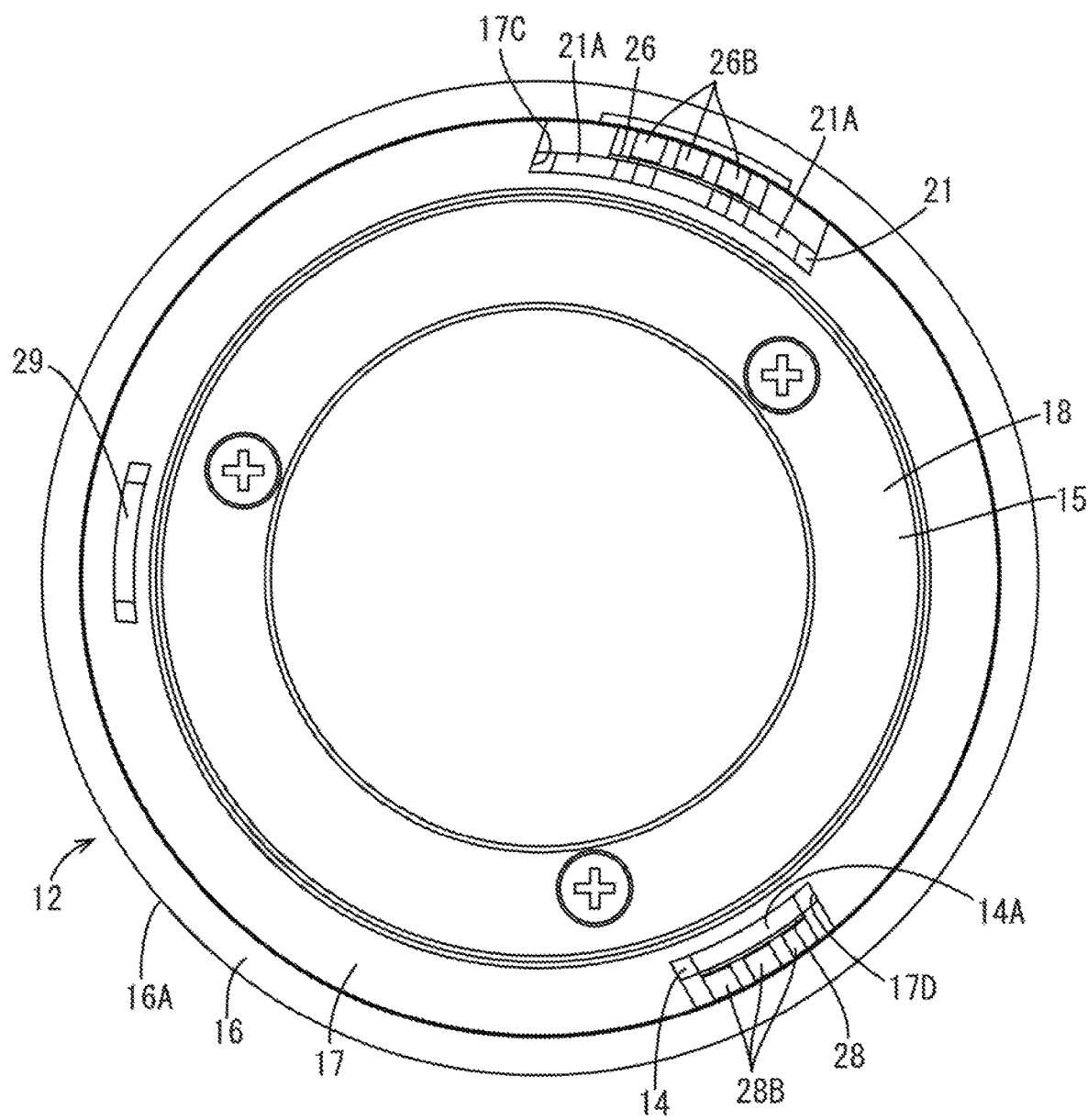
FIG. 8 is a bottom view of the dial.
Figure 10:
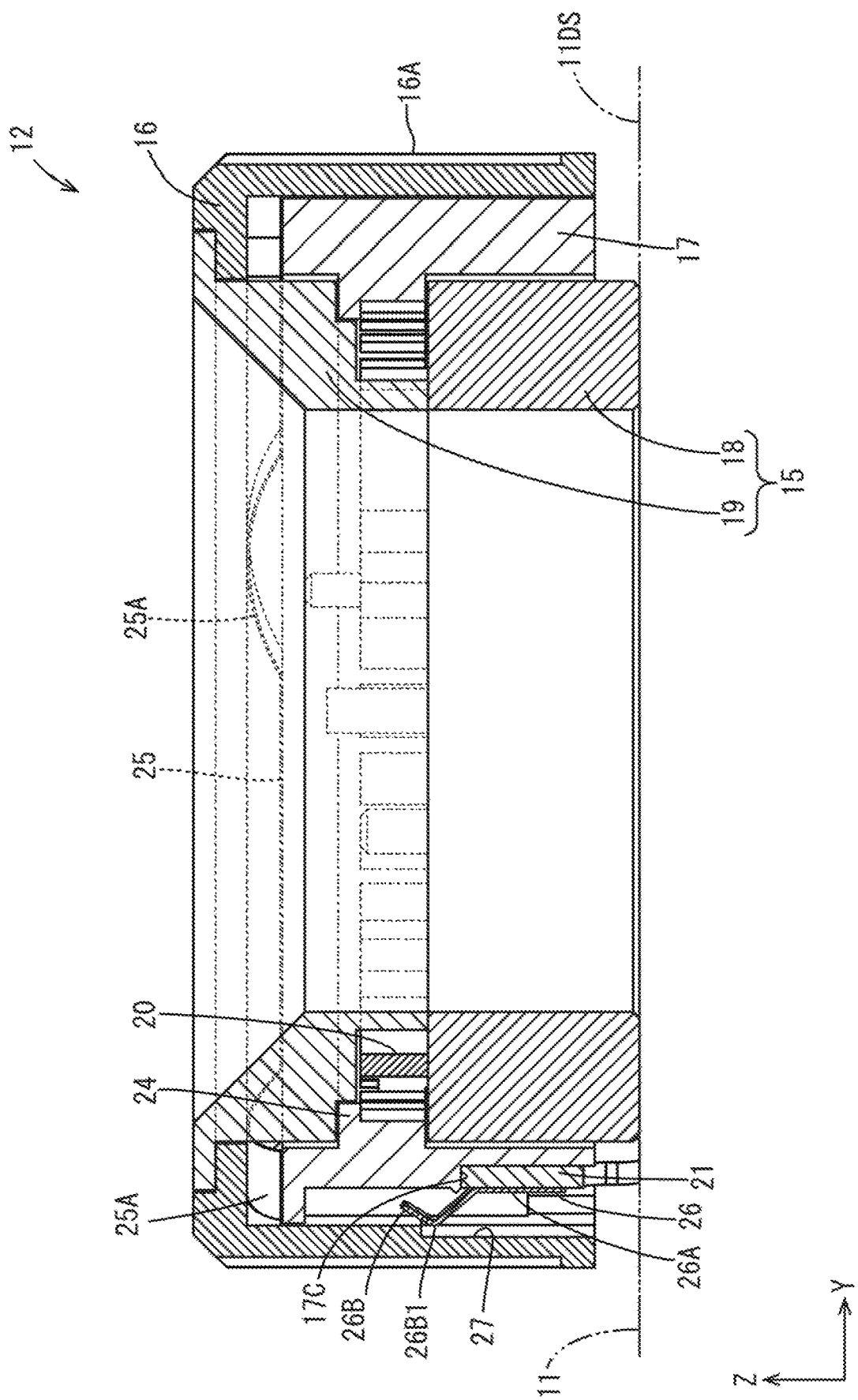
FIG. 10 is a cross-sectional view of the dial having the rotary portion at the standby position and taken along line C-C in FIG. 5.

Next, the push detectable portion 21 is described in detail. The push detectable portion 21 is formed of a conductive metal and is attached to the non-conductive second rotary portion 17 as illustrated in FIGS. 7 to 9. The push detectable portion 21 has a plate-like shape curved along the outer circumferential surface of the second rotary portion 17. The push detectable portion 21 is inserted into a push detectable portion attachment groove 17C, which is a cutout in the second rotary portion 17 opening to the rear side in the Z axis direction, and held by the second rotary portion 17. The push detectable portion 21 has a slit at the middle and branches into two in lateral view, and thus the push detectable portion 21 has two divided push detectable surfaces (detectable surfaces) 21A, which face the display surface 11DS of the liquid crystal display device 11 so as to be subjected to the position detection of the position detector 13. The two push detectable surfaces 21A are spaced apart from each other in the rotation direction of the dial 12 and are in contact with or at a short distance from the display surface 11DS of the liquid crystal display device 11 in the Z axis direction. As illustrated in FIGS. 7 and 10, the push detectable portion 21 includes a push detection elastic contact portion 26 capable of being in elastic contact with the rotary portion 16 (counterpart). The push detection elastic contact portion 26 is formed of a conductive metal and has a push detection base 26A attached to the push detectable portion 21 and three push detection elastic contact pieces 26B extending from the push detection base 26A in the Z axis direction toward the front side. The push detection elastic contact pieces 26B each have a V-like end portion in lateral view at a side away from the push detection base 26A. The top of the V-like end portion located at the outermost side in the radial direction is a contact portion 26B1 capable of being in contact with the inner surface of the rotary portion 16. The push detection elastic contact pieces 26B are elastically deformable with the push detection base 26A as a fulcrum and the push detection elastic contact portion 26 is displaced in the radial direction due to the elastic deformation. The rotary portion 16 has cutouts 27 opening toward the inner side in the radial direction and opening toward a rear side in the Z axis direction in the inner circumferential surface at positions corresponding to the push detection elastic contact portions 26 in the rotation direction. When the rotary portion 16 is positioned at the standby position, the cutouts 27 are positioned at the same position in the Z axis direction as the contact portions 26B1 of the push detection elastic contact portion 26 (see FIG. 10). However, when the rotary portion 16 is positioned at the advanced position, the cutouts 27 are positioned away from the push detection elastic contact portion 26 to the rear side in the Z axis direction (see FIG. 13). In this configuration, as illustrated in FIG. 10, when the rotary portion 16 is positioned at the standby position, the contact portions 26B1 of the push detection elastic contact portion 26 are positioned in the cutout 27 and are not in contact with the rotary portion 16. However, as illustrated in FIG. 13, when the rotary portion 16 is moved to the advanced position, the contact portions 26B1 go up onto the inner surface of the rotary portion 16 outside the cutout 27 and is in contact with the inner surface of the rotary portion 16. Thus, only when the rotary portion 16 is positioned at the advanced position, the push detection elastic contact portion 26 is elastic contact with the rotary portion 16, allowing the rotary portion 16 and the push detectable portion 21 to have the same potential.

Figure 11:
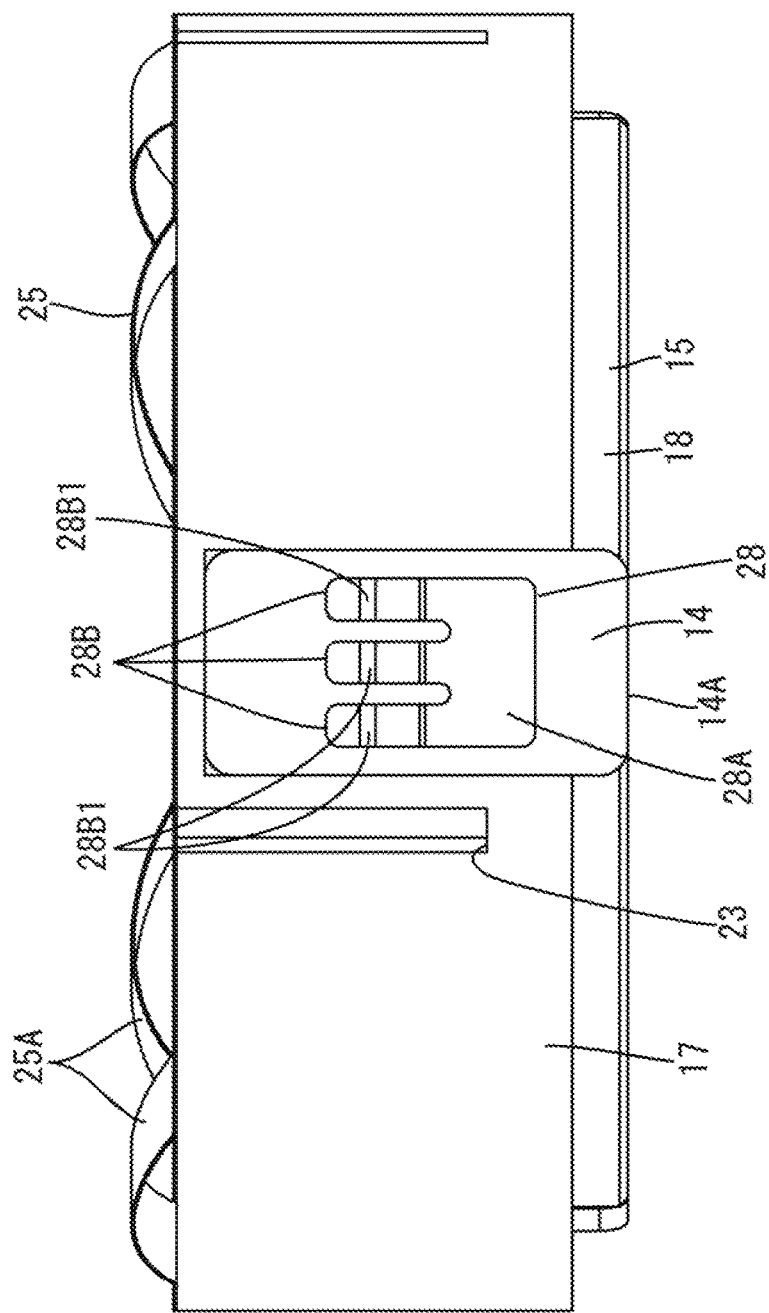
FIG. 11 is a side view of the dial without the rotary portion and has the rotation detectable portion at the front.

Next, the rotation detectable portion 14 is described in detail. The rotation detectable portion 14 is formed of a conductive metal and is attached to the non-conductive second rotary portion 17 as illustrated in FIGS. 8 and 11. The rotation detectable portion 14 has a plate-like shape curved along the outer circumferential surface of the second rotary portion 17. The rotation detectable portion 14 is inserted into a rotation attachment groove 17D, which is a cutout in the second rotary portion 17 opening to the rear side in the Z axis direction, and held by the second rotary portion 17. The rotation detectable portion 14 has one rotation detectable surface (detectable surface) 14A facing the display surface 11DS of the liquid crystal display device 11 so as to be subjected to the position detection of the position detector 13. The number of rotation detectable surfaces 14A of the rotation detectable portion 14 differs from that of push detectable surfaces 21A of the push detectable portion 21. The rotation detectable surface 14A is in contact with or at a short distance from the display surface 11DS of the liquid crystal display device 11 in the Z axis direction. The length and the area of the rotation detectable surface 14A in the rotation direction of the dial 12 differ from those of the push detectable surface 21A. As illustrated in FIGS. 6 and 11, the rotation detectable portion 14 has a rotation detection elastic contact portion 28 capable of being in elastic contact with the rotary portion 16 (counterpart). The rotation detection elastic contact portion 28 is formed of a conductive metal and has a rotation detection base 28A attached to the rotation detectable portion 14 and three rotation detection elastic contact pieces 28B extending from the rotation detection base 28A in the Z axis direction toward the front side. The rotation detection elastic contact pieces 28B each have a V-like end portion in lateral view at a side away from the rotation detection base 28A. The top of the V-like end portion located at the outermost side in the radial direction is a contact portion 28B1 capable of being in contact with the inner surface of the rotary portion 16. The rotation detection elastic contact pieces 28B are elastically deformable with the rotation detection base 28A as a fulcrum and the rotation detection elastic contact portion 28 is displaced in the radial direction due to the elastic deformation. The inner circumferential surface of the rotary portion 16 has a smooth surface extending in the Z axis direction at a position corresponding to the rotation detection elastic contact portion 28 in the rotation direction. The distance between the smooth surface and the rotation detectable portion 14 is substantially the same as the protrusion height of the rotation detection elastic contact pieces 28B. In this configuration, the rotation detection elastic contact portion 28 is in elastic contact with the rotary portion 16 at either of the standby position (see FIG. 6) or the advanced position (see FIG. 14), allowing the rotary portion 16 and the push detectable portion 21 to always have the same potential. During the movement of the rotary portion 16 between the standby position and the advanced position, the rotation detection elastic contact portion 28 slides on the rotary portion 16 and keeps in elastic contact with the rotary portion 16.

As illustrated in FIGS. 6 and 9, the rotation detectable portion 14 and the push detectable portion 21 each have a portion sticking out from the rear surface of the second rotary portion 17 to the rear side in the Z axis direction. The rear surface of the rotary portion 16 is flush with the rear surface of the second rotary portion 17. Thus, the rotation detectable portion 14 and the push detectable portion 21 each also have a portion sticking out from the rear surface of the rotary portion 16 to a position closer than the rotary portion 16 to the liquid crystal display device 11 in the Z axis direction. The sticking-out end surface of the rotation detectable portion 14 and that of the push detectable portion 21 are substantially flush with each other. With this configuration, the positions of the rotation detectable portion 14 and the push detectable portion 21 in the X axis direction and the Y axis direction in the display surface 11DS are detectable by the position detector 13. As illustrated in FIG. 8, the non-conductive second rotary portion 17 further has a protrusion 29 projecting to the rear side in the Z axis direction. The projection end surface of the protrusion 29 is substantially flush with the sticking-out end surfaces of the rotation detectable portion 14 and the push detectable portion 21. The protrusion 29 fills a gap between the rear surface of the second rotary portion 17 and the display surface 11DS of the liquid crystal display device 11 together with the rotation detectable portion 14 and the push detectable portion 21 and supports the second rotary portion 17. If the second rotary portion 17 does not have the protrusion 29, the second rotary portion 17, which is supported by only the rotation detectable portion 14 and the push detectable portion 21, would tilt. The protrusion 29 is provided to reliably support the second rotary portion 17 and to reduce the possibility that the second rotary portion 17 will tilt. The protrusion 29, the rotation detectable portion 14, and the push detectable portion 21 are located at a regular angular interval of about 120 degrees in the rotation direction.

Figure 12:
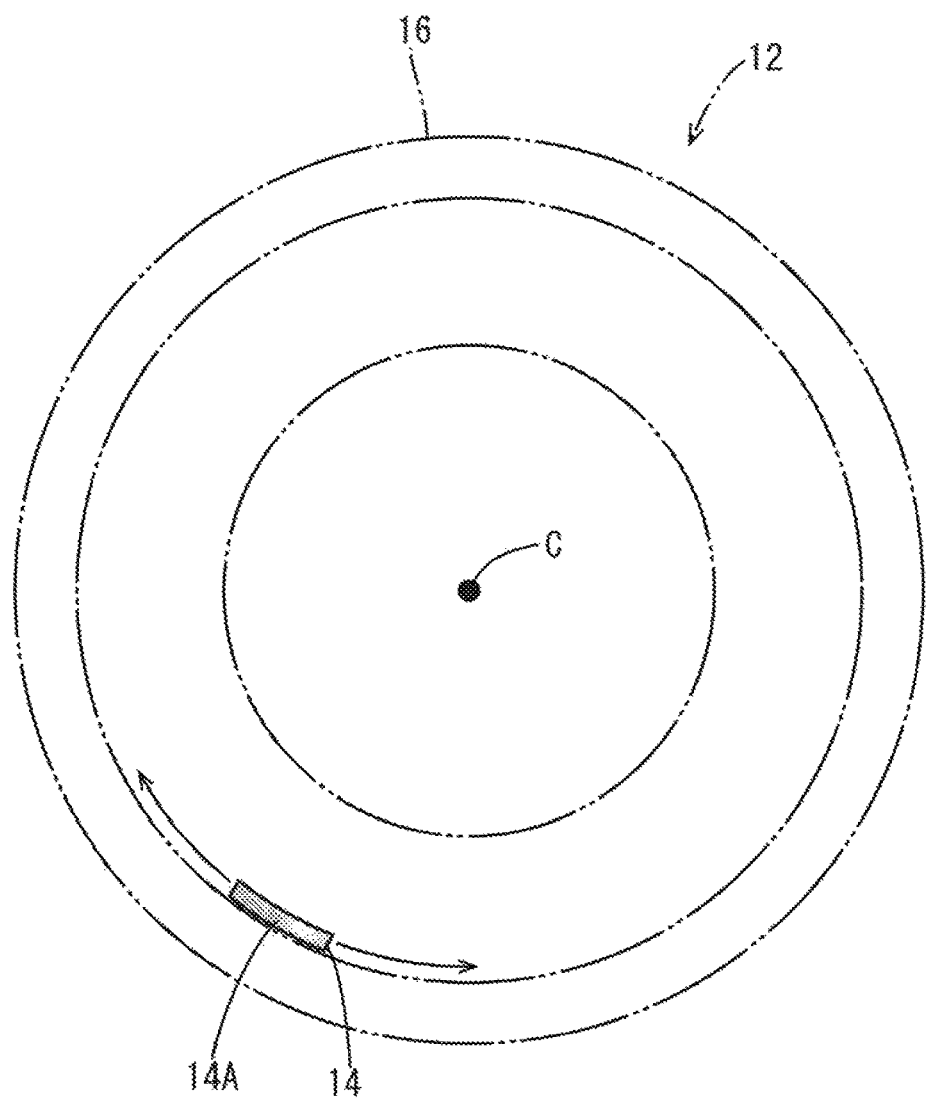
FIG. 12 is a view for explaining how the position of the rotation detectable portion after rotation of the dial is detected.

This embodiment has the above-described structure. Next, the operation of the embodiment is described. When the user holds the operation surface 16A of the rotary portion 16 of the dial 12 between the fingers FIN for rotation as illustrated in FIG. 1, the rotary portion 16 and the second rotary portion 17 are rotated relative to the stationary member 15 and the liquid crystal display device 11. The rotary portion 16, which is elastically supported by the biasing member 25, is held at the standby position in the absence of pushing force. The rotation detectable portion 14 and the push detectable portion 21, which are included in the second rotary portion 17, are rotated when the rotary portion 16 and the second rotary portion 17 are rotated. The smooth rotation of rotary portion 16 and the second rotary portion 17 is achieved by the rotation guide 24 (see FIG. 6) included in the second rotary portion 17. During the rotation, as illustrated in FIG. 12, the rotation detectable portion 14 moves in a circle around the center C of the dial 12 (rotation axis). As illustrated in FIG. 6, the rotation detectable portion 14 includes the rotation detection elastic contact portion 28 in elastic contact with the rotary portion 16. This allows the rotation detectable portion 14 to have the same potential as the fingers FIN through the rotary portion 16 and the rotation detection elastic contact portion 28 as long as the user holds the operation surface 16A of the rotary portion 16 between the fingers FIN. Thus, as illustrated in FIG. 12, the position of the rotation detectable portion 14 rotatable together with the rotary portion 16 is properly detected by the position detector 13 including the capacitive touch panel pattern 11TP. In contrast, as illustrated in FIG. 10, although the push detectable portion 21 has the push detection elastic contact portion 26, the contact portion 26B1 of the push detection elastic contact piece 26B is in the cutout 27 and is not in contact with the rotary portion 16 that is positioned at the standby position. In this state, the push detectable portion 21 is not electrically connected to the rotary portion 16, and thus the position of the push detectable portion 21 is undetectable by the position detector 13. In FIG. 12, only the rotation detectable portion 14 to be detected by the position detector 13 is shaded. Information relating to the rotation state such as the number of rotations of the dial 12, the angle of rotation, and the speed of rotation is obtained through the detection of the position of the rotation detectable portion 14 using the position detector 13. This configuration enables an image corresponding to the rotation state of the dial 12 to be displayed by using the obtained information. Furthermore, during the rotation of the dial 12, as illustrated in FIG. 5, the arm 20B of the latch 20 slides on the inner circumferential recesses 17A and the inner circumferential protrusions 17B, which are alternately arranged in the rotation direction, and repeatedly elastically deforms and elastically restores with the two supporting portions 20A as fulcrums. The deformation and restoring of the arm 20B generate clicky sounds and causes a vibration. The clicky sound and the vibration allow the user to perceive the rotation state of the dial 12 by a sense of hearing and a sense of touch in an intuitive way.

Figure 15:
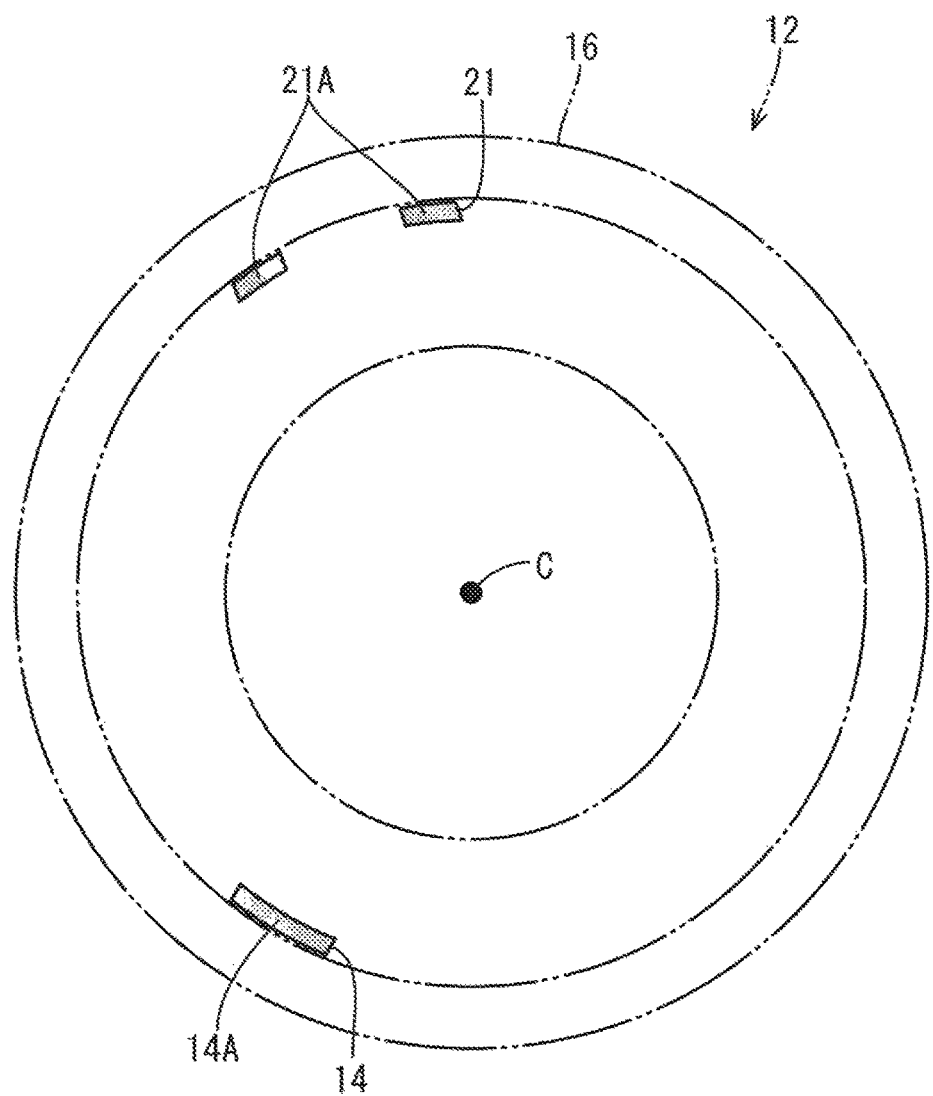
FIG. 15 is a view for explaining how the positions of the rotation detectable portion and the push detectable portion after rotation of the dial are detected.

The following is an explanation about the pushing action by the user after the rotation action. When the user pushes the rotary portion 16 to the rear side in the Z axis direction while holding the operation surface 16A of the rotary portion 16 between the fingers FIN, the rotary portion 16 at the standby position illustrated in FIGS. 6, 9, and 10 is moved to the rear side in the Z axis direction. During the movement, the rail 22 of the rotary portion 16 slides on the inner surface of the groove 23 of the second rotary portion 17, and thus smooth movement of the rotary portion 16 relative to the second rotary portion 17 in the Z axis direction (see FIG. 5) is achieved. The rotation guide 24 of the second rotary portion 17, which is sandwiched between the first stationary portion 18 and the second stationary portion 19, is unmovable relative to the stationary member 15 in the Z axis direction. Only the rotary portion 16 is moved toward the liquid crystal display device 11 in the Z axis direction. As illustrated in FIG. 13, when the rotary portion 16 is pushed by the user to the advanced position, the contact portion 26B1 of the push detection elastic contact piece 26B of the push detection elastic contact portion 26 goes up onto the inner surface of the rotary portion 16, which is located outside the cutout 27, to be in contact with the inner surface of the rotary portion 16. Thus, the push detectable portion 21 and the fingers FIN have the same potential through the rotary portion 16 and the push detection elastic contact portion 26, enabling the position of the push detectable portion 21 to be detected by the position detector 13. In contrast, as illustrated in FIG. 14, the rotation detection elastic contact piece 28B of the rotation detection elastic contact portion 28 is kept in elastic contact with the inner surface of the rotary portion 16 that is positioned at the advanced position. Thus, the rotation detectable portion 14 and the fingers FIN have the same potential through the rotary portion 16 and the rotation detection elastic contact portion 28. With this configuration, when the rotary portion 16 arrives the advanced position, as illustrated in FIG. 15, the position of the rotation detectable portion 14 and the position of the push detectable portion 21 are reliably detected by the position detector 13 including the capacitive touch panel pattern 11TP. In this way, when the rotary portion 16 is positioned at the standby position, the position of the push detectable portion 21 is undetectable by the position detector 13. The position of the push detectable portion 21 becomes detectable by the position detector 13 only when the rotary portion 16 is positioned at the advanced position. The detection statuses of the position obtained by the position detector 13 are different. Thus, it is determined that the pushing action was performed when the position of the push detectable portion 21 is detected. In FIG. 15, the rotation detectable portion 14 and the push detectable portion 21 detected by the position detector 13 are shaded.

Here, as illustrated in FIG. 15, the rotation detectable surface 14A of the rotation detectable portion 14 and the push detectable surface 21A of the push detectable portion 21, which are subjected to the position detection using the position detector 13, have different sizes. The area subjected to the position detection by the position detector 13 is different between the rotation detectable surface 14A and the push detectable surface 21A. Furthermore, the number of rotation detectable surfaces 14A of the rotation detectable portion 14 and the number of push detectable surfaces 21A of the push detectable portion 21 differ from each other. The number of surfaces subjected to the position detection by the position detector 13 is different between the rotation detectable surface 14A and the push detectable surface 21A. As described above, the area and the number of surfaces subjected to the position detection by the position detector 13 are each different between the rotation detectable surface 14A and the push detectable surface 21A. This configuration reduces the possibility that the position detector 13 will mix up the rotation detectable surface 14A and the push detectable surface 21A under the influence of noise, for example.

As described above, the input detecting device 10 of the embodiment includes the liquid crystal display device (input receiver) 11 configured to receive position input, the position detector 13 included in the liquid crystal display device 11 and configured to detect at least a position of the position input, the rotary portion 16 rotatably attached to the liquid crystal display device 11 and configured to move between the standby spaced apart from the liquid crystal display device 11 and the advanced position closer than the standby position to the liquid crystal display device 11, the rotation detectable portion 14 configured to be rotated relative to the liquid crystal display device 11 together with the rotary portion 16 and whose position is detectable by the position detector 13, and the push detectable portion 21 whose position is detectable by the position detector 13 when the rotary portion 16 is positioned at one of the standby position and the advanced position.

In this configuration, when the user gives position input to the liquid crystal display device 11, the position detector 13 detects the input position. Meanwhile, when the user rotates the rotary portion 16, the rotary portion 16 rotates relative to the liquid crystal display device 11. At this time, the rotation detectable portion 14 is rotated relative to the liquid crystal display device 11 together with the rotary portion 16, and the position of the rotation detectable portion 14 is detected by the position detector 13. Furthermore, when the user pushes the rotary portion 16 (pushing action) positioned at the standby position, which is away from the liquid crystal display device 11, toward the liquid crystal display device 11, the rotary portion 16 moves to the advanced position, which is closer than the standby position to the liquid crystal display device 11. Here, the position of the push detectable portion 21 is detectable by the position detector 13 when the rotary portion 16 is positioned at one of the standby position and the advanced position. Thus, when the rotary portion 16 at the standby position is pushed to the advanced position, the detection status of the push detectable portion 21 by the position detector 13 changes. Based on the change, it is determined whether the pushing action was performed. As described above, when the user performs the rotation action and the pushing action in a row, the user does not need to release his/her fingers from the rotary portion 16. This configuration has high operability.

Furthermore, the position detector 13 includes the capacitive touch panel pattern 11TP, the rotary portion 16 is conductive, the rotation detectable portion 14 is conductive and electrically connected to the rotary portion 16, and the push detectable portion 21 is conductive and electrically connected to the rotary portion 16 when the rotary portion 16 is positioned at one of the standby position and the advanced position. In this configuration, the conductive rotation detectable portion 14 is electrically connected to the conductive rotary portion 16, and thus the rotation detectable portion 14 and the rotary portion 16 have the same potential as the user when the rotary portion 16 is rotated by the user. In contrast, the conductive push detectable portion 21 is electrically connected to the rotary portion 16 when the rotary portion 16 is positioned at one of the standby and the advanced position, and thus the push detectable portion 21 and the rotary portion 16 have the same potential as the user when the rotary portion 16 is positioned at one of the standby position and the advanced position when the rotary portion 16 is pushed by the user. Thus, the position of the rotary detectable portion 14 and the position of the push detectable portion 21 are each reliably detected the position detector 13 including the capacitive touch panel pattern 11TP.

The position detecting device 10 further includes the second rotary portion 17 configured to be rotated together with the rotary portion 16. The second rotary portion 17 is attached to the rotary portion 16 without inhibiting the movement of the rotary portion 16 in a moving direction of the rotary portion 16 toward and away from the liquid crystal display device 11. The rotation detectable portion 14 is included in the second rotary portion 17. In this configuration, when the rotary portion 16 is rotated relative to the liquid crystal display device 11, the second rotary portion 17 and the rotation detectable portion 14 are rotated together with the rotary portion 16. In contrast, when the rotary portion 16 is pushed, the rotary portion 16, which is movable relative to the second rotary portion 17 and the rotation detectable portion 14 in the moving direction, moves toward the liquid crystal display device 11, but the second rotary portion 17 and the rotation detectable portion 14 do not move toward the liquid crystal display device 11. Thus, the pushing action does not change the positional relationship between the rotation detectable portion 14 and the liquid crystal display device 11 in the moving direction. The rotation detectable portion 14 does not come in contact with the liquid crystal display device 11, for example.

Furthermore, the rotation detectable portion 14 has the portion sticking out from the second rotary portion 17 toward the liquid crystal display device 11, and the second rotary portion 17 has the protrusion 29 projecting toward the liquid crystal display device 11. In this configuration, the position of the rotation detectable portion 14, which has the portion sticking out from the second rotary portion 17 toward the liquid crystal display device 11, is reliably detected by the position detector 13 including the capacitive touch panel pattern 11TP. Although the rotation detectable portion 14 sticks out from the second rotary portion 17 toward the liquid crystal display device 11, the rotary portion 16 is reliably supported relative to the liquid crystal display device 11 by the protrusion 29 protruding from the second rotary portion 17 toward the liquid crystal display device 11.

Furthermore, the input detecting device 10 further includes the biasing member 25 located between the rotary portion 16 and the second rotary portion 17 and configured to elastically bias the rotary portion 16 toward the standby position. In this configuration, when the rotary portion 16 at the standby position is pushed to the advanced position, the rotary portion 16 is elastically biased toward the standby position by the biasing member 25 located between the rotary portion 16 and the second rotary portion 17. Thus, when the user stops the pushing action, the biasing force of the biasing member 25 allows the rotary portion 16 at the advanced position to move back to the standby position. This eliminates the need for the user to move the rotary portion 16 at the advanced position back to the standby position after the pushing action, resulting in higher operability.

Furthermore, at least one of the rotary portion 16 and the push detectable portion 21 has the push detection elastic contact portion 26 configured to be in elastic contact with the rotary portion 16 (counterpart) when the rotary portion 16 is positioned at one of the standby position and the advanced position. The push detectable portion 21 is included in the second rotary portion 17. In this configuration, when the rotary portion 16 at the standby position is pushed to the advanced position, the push detection elastic contact portion 26 comes in elastic contact with the rotary portion 16 (counterpart) or the push detection elastic contact portion 26 is separated from the rotary portion 16 (counterpart). In other words, whether the push detection elastic contact portion 26 is in elastic contact with the rotary portion 16 (counterpart) depends on whether the rotary portion 16 is positioned at the standby position or the advanced position. Whether the rotary portion 16 and the push detectable portion 21 are electrically connected to each other depends on whether the rotary portion 16 is in elastic contact with the push detection elastic contact portion 26. In this configuration, the user's pushing action changes the detection status of the position of the push detectable portion 21 obtained by the position detector 13 including the capacitive touch panel pattern 11TP. Based on the change, it is determined that the pushing action was performed. The positional relationship between the push detectable portion 21 and the liquid crystal display device 11 is stable in the moving direction, because the push detectable portion 21 is included in the second rotary portion 17, not in the rotary portion 16. This reduces false position detection by the position detector 13.

Furthermore, the push detection elastic contact portion 26 is out of contact with the rotary portion 16 (counterpart) when the rotary portion 16 is positioned at the standby position and is in contact with the rotary portion 16 (counterpart) when the rotary portion 16 is positioned at the advanced position. In this configuration, when the rotary portion 16 at the standby position is pushed to the advanced position, the push detection elastic contact portion 26 is in elastic contact with the rotary portion 16 (counterpart). In other words, when the rotary portion 16 is positioned at the standby position, the rotary portion 16 and the push detectable portion 21 are not electrically connected to each other, and when the rotary portion 16 is positioned at the advanced position, the rotary portion 16 and the push detectable portion 21 are electrically connected to each other. Before the pushing action, the position of the push detectable portion 21 is undetectable by the position detector 13 including the capacitive touch panel pattern 11TP. After the pushing action, the position of the push detectable portion 21 is detectable by the position detector 13 including the capacitive touch panel pattern 11TP. It is determined that the pushing action was performed when the position of the push detectable portion 21 is detected.

Furthermore, at least one of the rotary portion 16 and the rotation detectable portion 14 has the rotation detection elastic contact portion 28 configured to be in elastic contact with the rotary portion 16 (counterpart). In this configuration, when the rotary portion 16 at the standby position is pushed to the advanced position, although the rotary portion 16 moves relative to the second rotary portion 17 in the moving direction, electrical connection between the rotation detectable portion 14 included in the second rotary portion 17 and the rotary portion 16 is kept, because the rotation detection elastic contact portion 28 included in at least one of the rotary portion 16 and the rotation detectable portion 14 is in elastic contact with the rotary portion 16 (counterpart). Thus, the position of the rotation detectable portion 14 is detectable by the position detector 13 including the capacitive touch panel pattern 11TP.

Furthermore, the push detectable portion 21 and the rotation detectable portion 14 have the rotation detectable surface 14A (detectable surface) and the push detectable surface 21A (detectable surface) each facing the liquid crystal display device 11 and subjected to position detection by the position detector 13, and the rotation detectable surface 14A and the push detectable surface 21A have different sizes. This reduces the possibility that the position detector 13 will mix up the rotation detectable surface 14A and the push detectable surface 21A, which is the detectable surface of the push detectable portion 21, and the rotation detectable surface 14A and the push detectable surface 21A, which is the detectable surface of the rotation detectable portion 14, compared with a case in which the rotation detectable surface 14A and the push detectable surface 21A, which are the detectable surfaces of the push detectable portion 21 and the rotation detectable portion 14, have the same size.

Furthermore, the number of push detectable surfaces 21A of the push detectable portion 21 and the number of rotation detectable surfaces 14A of the rotation detectable portion 14 are different. This configuration reduces the possibility that the position detector 13 will mix up the rotation detectable surface 14A and the push detectable surface 21A, which is the detectable surface of the push detectable portion 21, and the rotation detectable surface 14A and the push detectable surface 21A, which is the detectable surface of the rotation detectable portion 14, compared with a case in which the rotation detectable surfaces 14A of the rotation detectable portion 14 and the push detectable surfaces 21A of the push detectable portion 21 are different in size but the same in number.

Furthermore, the input detecting device 10 includes the stationary member 15 fixed to the liquid crystal display device 11 and to which the rotary portion 16 is rotatably attached. In this configuration, the rotary portion 16 is rotatably held by the stationary member 15 fixed to the liquid crystal display device 11. If the rotary portion 16 is included in a sliding member configured to slide on the liquid crystal display device 11, the user would fail to perform position input on the liquid crystal display device 11 due to the sliding member. The stationary member 15 prevents such a problem and allows the user to smoothly give position input to the liquid crystal display device 11. Furthermore, this configuration does not require a sliding mechanism for sliding the sliding member.

Further, the input detecting device 10 includes the latch 20 having the supporting portion 20A fixed to the stationary member 15 and the arm 20B configured to be elastically deformed with the supporting portion 20A as a fulcrum and in contact with an inner circumferential surface of the rotary portion 16. The inner circumferential surface of the rotary portion 16 has the inner circumferential recesses (recesses) 17A and the inner circumferential protrusions (protrusions) 17B alternately arranged in the rotation direction of the rotary portion 16. In this configuration, the latch 20 has the supporting portion 20A fixed to the stationary member 15 and the arm 20B in contact with the inner circumferential surface of the rotary portion 16. When the rotary portion 16 is rotated relative to the stationary member 15, the inner circumferential recesses 17A and the inner circumferential protrusions 17B of the inner circumferential surface of the rotary portion 16 moves in the rotation direction relative to the latch 20. During the movement, the arm 20B of the latch 20 slides on the inner circumferential recesses 17A and the inner circumferential protrusions 17B, which are alternately arranged in the rotation direction, and is repeatedly elastically deformed and elastically restored with the supporting portion 20A as a fulcrum. The displacement of the arm 20B generates sound. The user recognizes the rotation state of the rotary portion 16 by the sound.

Furthermore, the stationary member 15 includes the first stationary portion 18 located closer than the latch 20 to the liquid crystal display device 11 and the second stationary portion 19 sandwiching the latch 20 with the first stationary portion 18. In this configuration, the latch 20 sandwiched between the first stationary portion 18 and the second stationary portion 19 is held in a position. This configuration allows easy removal of the latch 20 from the stationary member 15.

Second Embodiment

Figure 17:
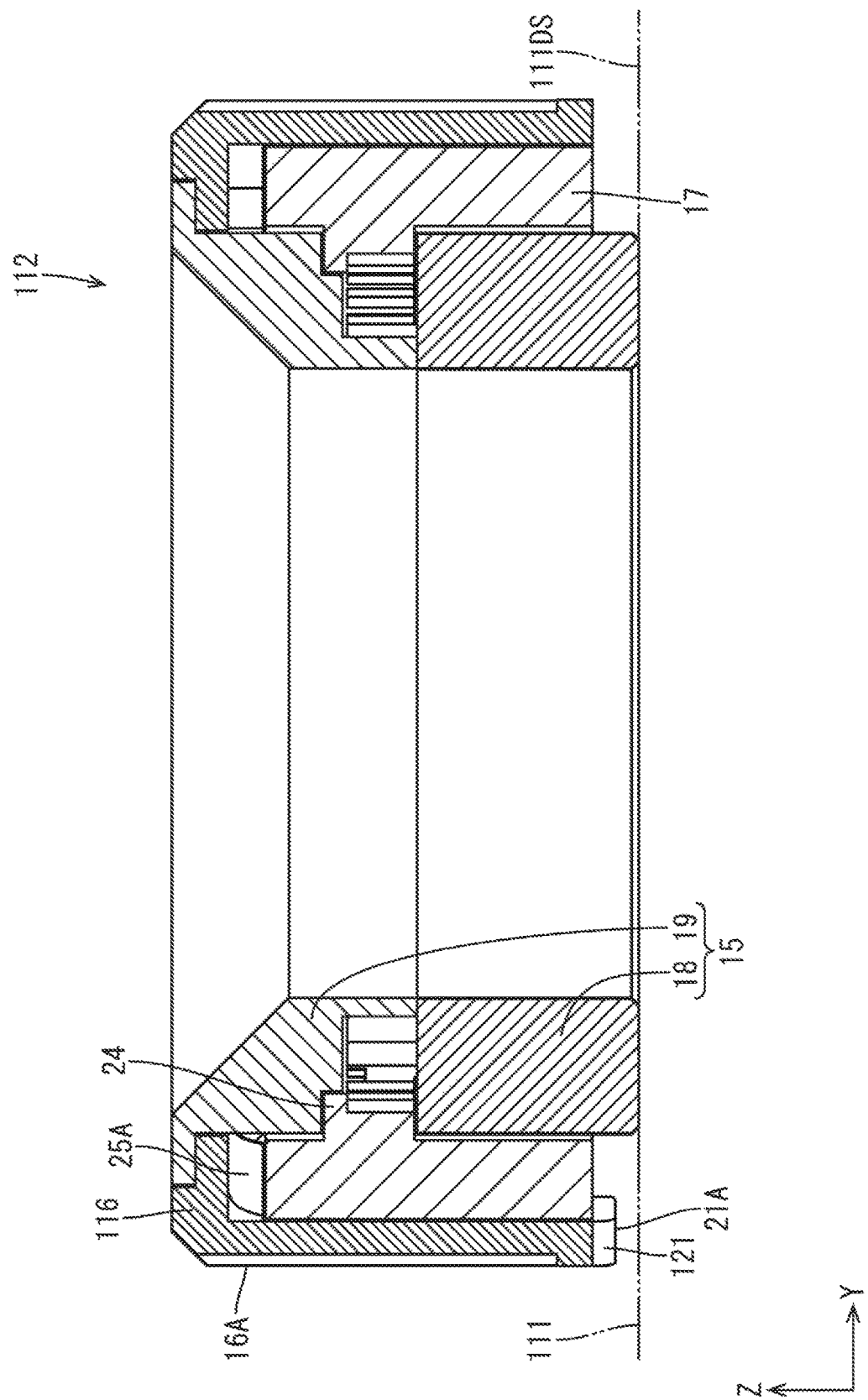
FIG. 17 is a cross-sectional view of the dial having the rotary portion at the standby position and taken along line D-D in FIG. 16.
Figure 18:
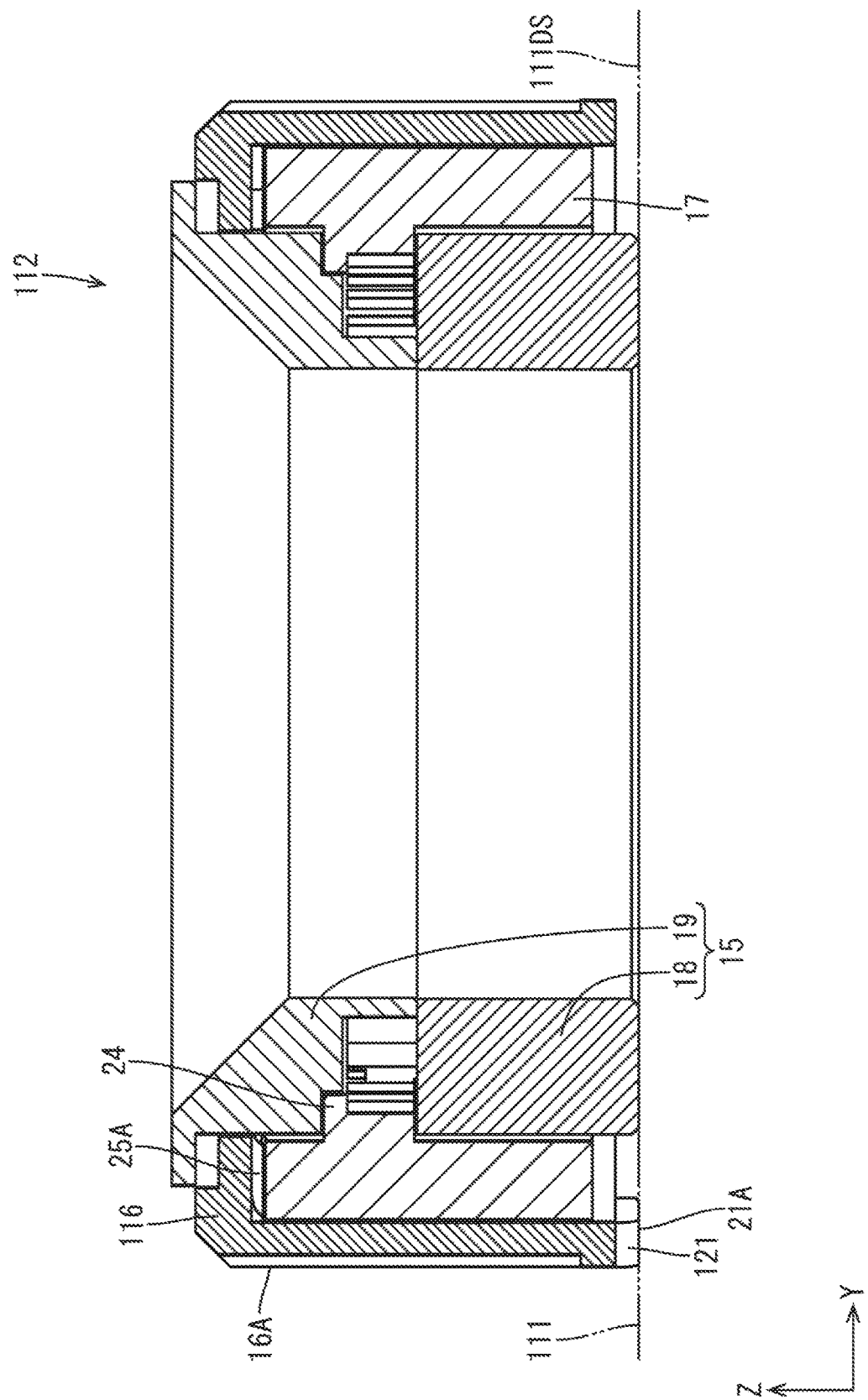
FIG. 18 is a cross-sectional view of the dial having the rotary portion at the advanced position and taken along line D-D in FIG. 16.

A second embodiment of the invention is described with reference to FIGS. 16 to 18. In the second embodiment, a push detectable portion 121 has a different configuration. The same components, effects, and advantages as those in the first embodiment are not described.

Figure 16:
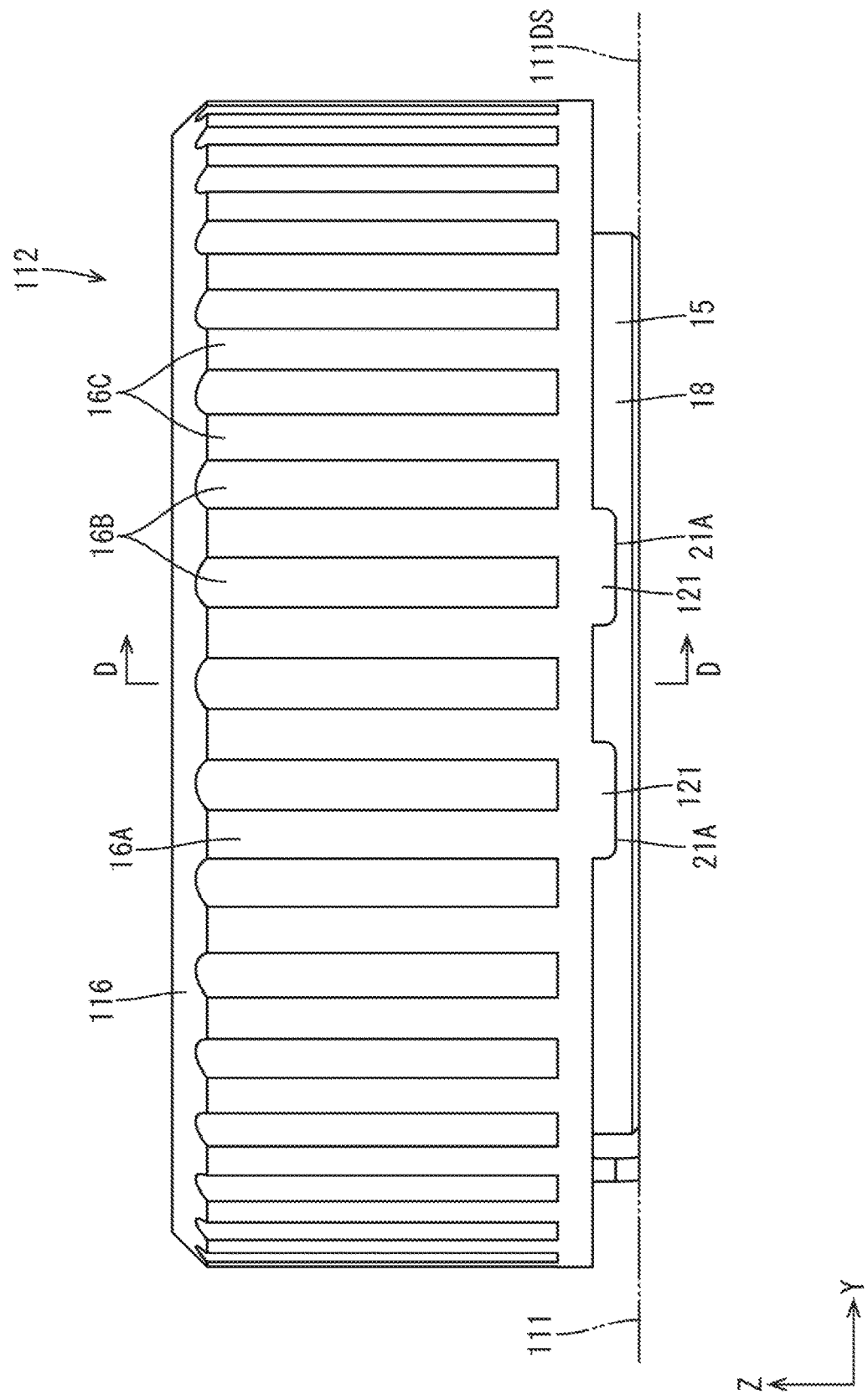
FIG. 16 is a side view of a dial according to a second embodiment of the invention having the rotary portion at the standby position and has the rotation detectable portion at the front.

As illustrated in FIG. 16, the push detectable portion 121 in this embodiment is an integral component of the rotary portion 116. The push detectable portion 121 protrudes from the rear surface of the rotary portion 116 to the rear side (toward the liquid crystal display device 111) in the Z axis direction. Two push detectable portions 121 are located with a space therebetween in the rotation direction of the dial 112. When the rotary portion 116 is positioned at the standby position, as illustrated in FIG. 17, the push detectable portion 121 is spaced apart from the display surface 111DS of the liquid crystal display device 111 with a predetermined distance in the Z axis direction. In contrast, when the rotary portion 116 is positioned at the advanced position, as illustrated in FIG. 18, the push detectable portion 121 is in contact with or adjacent to the display surface 111DS of the liquid crystal display device 111. The distance between the push detectable portion 121 and the display surface 111DS in this case is small compared with when the rotary portion 116 is positioned at the standby position. In this configuration, when the rotary portion 116 at the standby position is pushed to the advanced position, the push detectable portion 121 is moved together with the rotary portion 116 to a position close to the liquid crystal display device 111 in the Z axis direction compared with when the rotary portion 116 is positioned at the standby position. Thus, the position detector including a capacitive touch panel pattern is unable to detect the position of the push detectable portion 121 when the rotary portion 116 is positioned at the standby position but is able to detect the position of the push detectable portion 121 when the rotary portion 116 is positioned at the advanced position. When the position of the push detectable portion 121 is detected by the position detector, it is determined that the pushing action was performed. In this embodiment, the push detectable portion attachment groove 17C, the push detection elastic contact portion 26, and the cutout 27 (see FIGS. 9 and 10), which are described in the first embodiment, for example, are eliminated, because the push detectable portion 121 is included in the rotary portion 116.

In the above-described embodiment, the push detectable portion 121 is included in the rotary portion 116. In this configuration, when the rotary portion 116 at the standby position is pushed to the advanced position, the push detectable portion 121 is moved together with the rotary portion 116 to the position close to the liquid crystal display device 111 in the moving direction compared with when the rotary portion 116 is positioned at the standby position. Thus, the position detector including a capacitive touch panel pattern is unable to detect the position of the push detectable portion 121 when the rotary portion 116 is positioned at the standby position but is able to detect the position of the push detectable portion 121 when the rotary portion 116 is positioned at the advanced position. When the position of the push detectable portion 121 is detected by the position detector, it is determined that the pushing action was performed.

Third Embodiment

The third embodiment of the invention is described with reference to FIGS. 19 to 22. In the third embodiment, a rotary portion 216 has a configuration different from that in the first embodiment. The same components, effects, and advantages as those in the first embodiment are not described.

Figure 19:
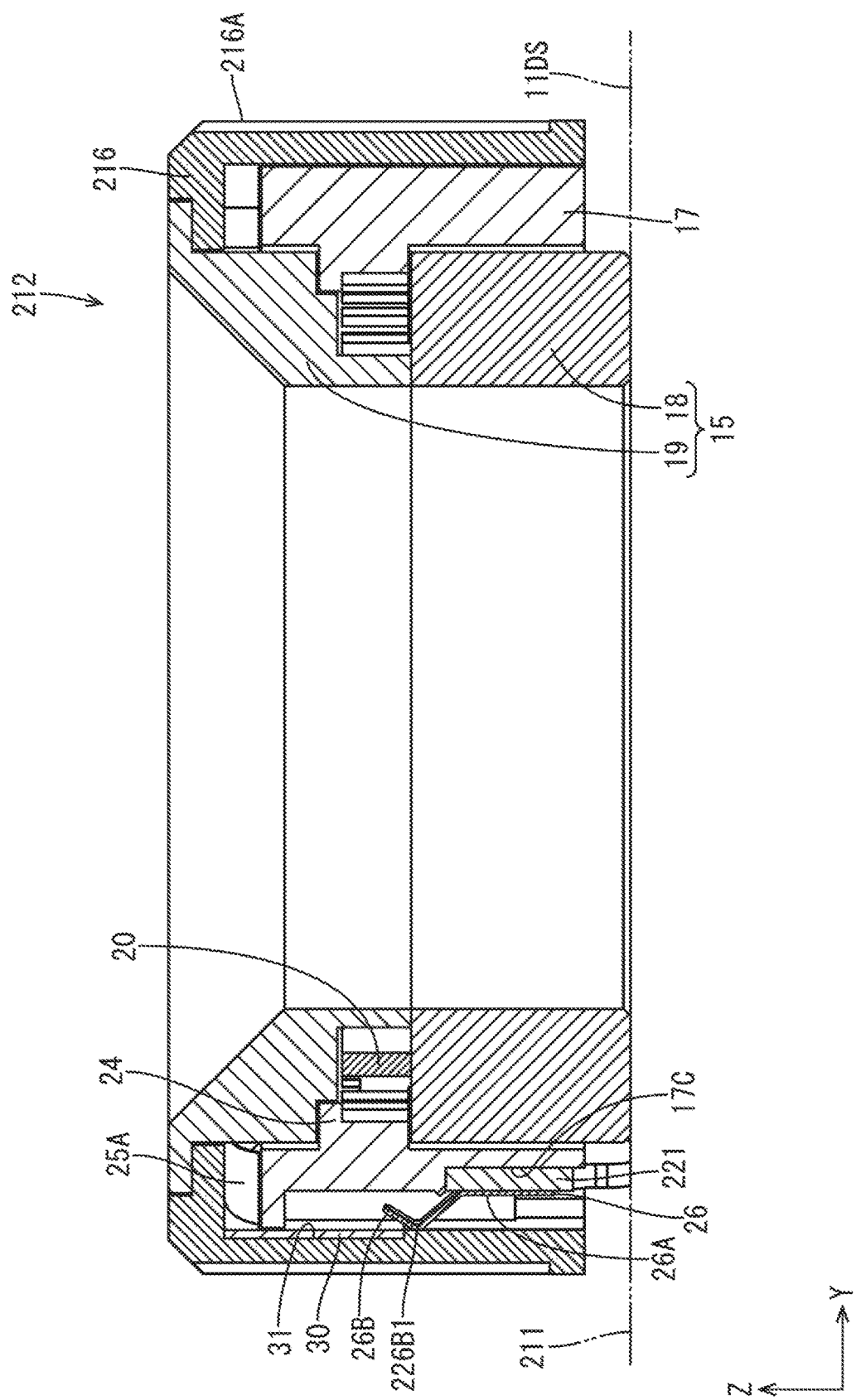
FIG. 19 is a cross-sectional view of a dial according to a third embodiment of the invention having the rotary portion at the standby position and taken along a line passing through a push detection elastic contact portion.
Figure 20:
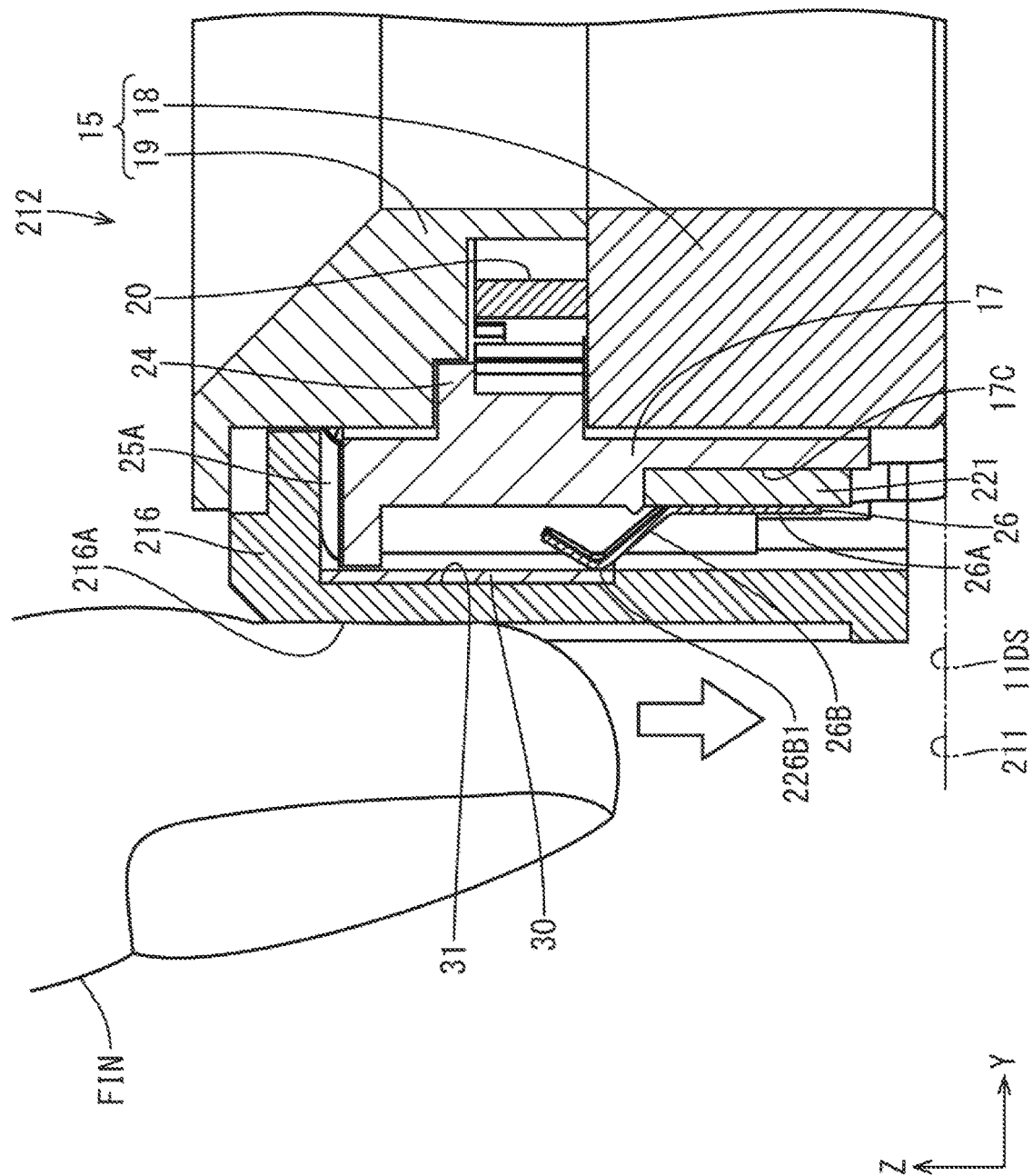
FIG. 20 is a cross-sectional view illustrating the dial having the rotary portion at the advanced position and taken along the push detection elastic contact portion.

As illustrated in FIGS. 19 and 20, the rotary portion 216 in this embodiment has an insulating portion 30 that is in contact with a push detection elastic contact portion 226 only when the rotary portion 216 is positioned at the advanced position. Specifically described, the inner surface of the rotary portion 216 has an insulating portion attaching recess 31 at a position overlapping the push detection elastic contact portion 226 in the rotation direction of the dial 212. The insulating portion 30 is attached to the insulating portion attaching recess 31. The depth of the insulating portion attaching recess 31 is substantially equal to the thickness of the insulating portion 30. The surface of the insulating portion 30 is substantially flush with the inner surface of the rotary portion 216. When the rotary portion 216 is positioned at the standby position, the insulating portion 30 is positioned on the front side of the push detection elastic contact portion 226 in the Z axis direction (side away from the liquid crystal display device 211). Thus, as illustrated in FIG. 19, when the rotary portion 216 is positioned at the standby position, the push detection elastic contact portion 226 is in elastic contact with the inner surface of the rotary portion 216, and as illustrated in FIG. 20, when the rotary portion 216 is positioned at the advanced position, the contact portion 226B1 is positioned on the insulating portion 30 and is not in contact with the rotary portion 216. This embodiment, which includes the insulating portion 30, does not require the cutout 27 described in the first embodiment (see FIG. 10).

Figure 21:
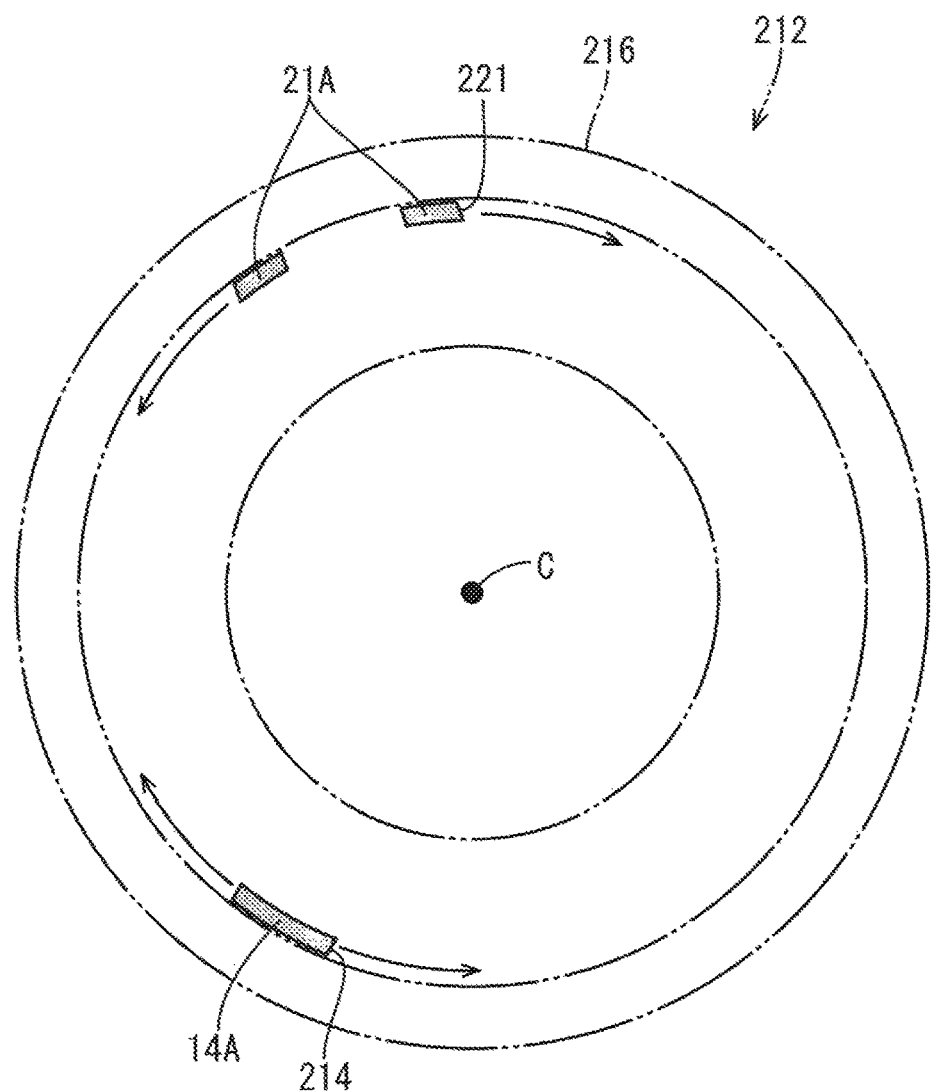
FIG. 21 is a view for explaining how the positions of the rotation detectable portion and the push detectable portion after the rotation of the dial are detected.
Figure 22:
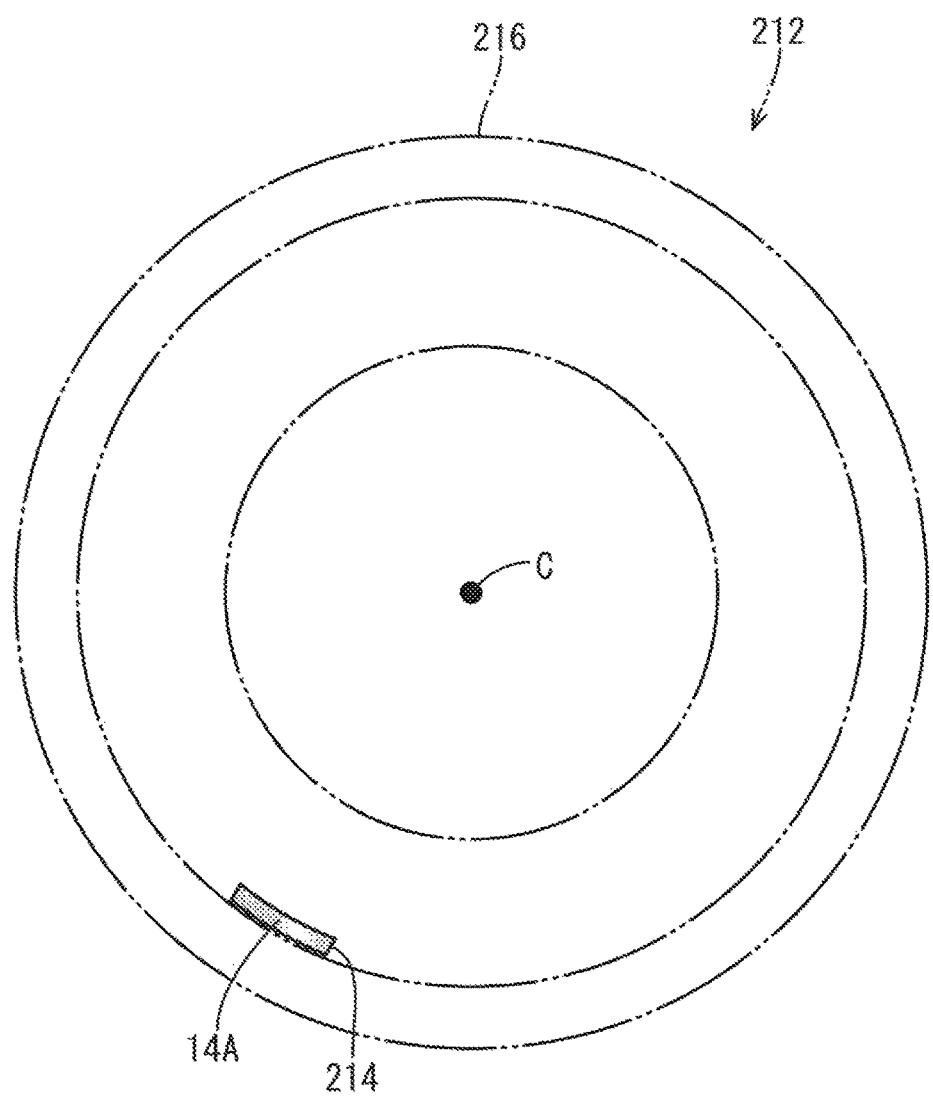
FIG. 22 is a view for explaining how the position of the rotation detectable portion after pushing of the dial is detected.

In this embodiment, when the user holds the pressure receiving surface 216A of the rotary portion 216 at the standby position between the fingers for rotation, the push detection elastic contact portion 226 is in elastic contact with the inner surface of the rotary portion 216 as illustrated in FIG. 19. Thus, the push detectable portion 221 and the fingers have the same potential through the rotary portion 216 and the push detection elastic contact portion 226. At this time, as described in the first embodiment, the rotation detectable portion (not illustrated) also has the same potential as the fingers. Thus, after the rotation action, as illustrated in FIG. 21, the positions of the rotation detectable portion 214 and the push detectable portion 221, which are rotated together with the rotary portion 216, are properly detected by the position detector including a capacitive touch panel pattern. In FIG. 21, the rotation detectable portion 214 and the push detectable portion 221, which are detectable by the position detector, are both shaded. In contrast, when the user pushes the rotary portion 216 to the rear side in the Z axis direction while holding the operation surface 216A of the rotary portion 216 between the fingers as illustrated in FIG. 20, the push detection elastic contact portion 226 goes up onto the insulating portion 30 and is separated from the rotary portion 216. Thus, the push detectable portion 221 is not electrically connected to the rotary portion 216. At this time, as described in the first embodiment, the rotation detectable portion (not illustrated) is kept electrically connected to the rotary portion 216. Thus, after the pushing action, as illustrated in FIG. 22, the position of the push detectable portion 221 is not detected by the position detector and only the position of the rotation detectable portion 214 is detected by the position detector. As described above, the position of the push detectable portion 221 is detectable by the position detector when the rotary portion 216 is positioned at the standby position but is not detectable by the position detector when the rotary portion 216 is positioned at the advanced position. The detection statuses obtained by the position detector are different. Thus, when the position of the push detectable portion 221 becomes undetectable, it is determined that the pushing action was performed. In FIG. 22, the rotation detectable portion 214 detectable by the position detector is shaded.

In the above-described embodiment, the push detection elastic contact portion 226 is not in contact with the rotary portion 216 (counterpart), when the rotary portion 216 is positioned at the advanced position but is in contact with the rotary portion 216 (counterpart), when the rotary portion 216 is positioned at the standby position. In this configuration, when the rotary portion 216 at the standby position is pushed to the advanced position, the push detection elastic contact portion 226 is separated from the rotary portion 216 (counterpart). In other words, the rotary portion 216 and the push detectable portion 221 are electrically connected to each other when the rotary portion 216 is positioned at the standby position, and the rotary portion 216 and the push detectable portion 221 are not electrically connected to each other when the rotary portion 216 is positioned at the advanced position. Before the pushing action, the position of the push detectable portion 221 is detectable by the position detector including a capacitive touch panel pattern. After the pushing action, the position of the push detectable portion 221 is undetectable by the position detector including a capacitive touch panel pattern. Thus, when the position of the push detectable portion 221 becomes undetectable, it is determined that the pushing action was performed.

Other Embodiments

The present invention is not limited to the embodiments described above and illustrated by the drawings. For example, the following embodiments are included in the technical scope of the present invention.

(1) In the above-described embodiments, the dial is an annular dial having an opening at the middle. However, the dial may be a cylindrical dial not having an opening at the middle.

(2) In the above-described embodiments, the push detectable portion is included in the rotary portion or the second rotary portion. However, the push detectable portion may be included in the stationary portion. In such a case, the push detectable portion does not rotate together with the rotary portion and is non-rotatable as the stationary portion.

(3) In the above-described embodiments 1 and 3, the push detection elastic contact portion is included in the second rotary portion. However, the push detection elastic contact portion may be included in the rotary portion. In such a case, the push detection elastic contact portion is configured to be in elastic contact with the push detectable portion of the second rotary portion when the rotary portion is positioned at one of the standby position and the advanced position. Alternatively, the push detection elastic contact portion may be included in each of the rotary portion and the second rotary portion.

(4) The first embodiment may have the insulating portion described in the third embodiment instead of the cutout. In such a case, when the rotary portion is positioned at the standby position, the push detection elastic contact portion is in contact with the insulating portion and is not in contact with the rotary portion.

(5) The first embodiment may have the cutout instead of the insulating portion described in the third embodiment. In such a case, when the rotary portion is positioned at the advanced position, the contact portion of the push detection elastic contact portion is positioned in the cutout and is not in contact with the rotary portion.

(6) In the above-described third embodiment, the rotary portion includes the insulating portion attachment recess in which the insulating portion is attached. However, the insulating portion attachment recess may be eliminated. In such a case, the insulating portion is attached to the inner surface of the rotary portion and a step is generated between the inner surface and the insulating portion.

(7) The position in the rotation direction of the push detectable portion and the rotation detectable portion and the number thereof may be suitably changed from those in the above-described embodiments.

(8) The position in the rotation direction of the push detectable surface and the rotation detectable surface, the number thereof, and the size in plan view thereof may be suitably changed from those in the above-described embodiments. In such a case, it is still preferable that the push detectable surface and the rotation detectable surface be different in numbers and sizes. However, the present invention is not limited to such a configuration.

(9) The position in the rotation direction of the protrusion protruding from the second rotary portion to the rear side, the number thereof, and the size thereof may be suitably changed from those in the above-described embodiments.

(10) The number of push detection elastic contact pieces of the push detection elastic contact portion may be changed from the number in the above-described embodiments and may be two or less or four or more. In the same way, the number of the rotation detection elastic contact pieces of the rotation detection elastic contact portion may be changed to two or less and four or more. Furthermore, the push detection elastic contact pieces and the rotation detection elastic contact pieces may extend in the rotation direction.

(11) In the above-described embodiments, the stationary member includes the first stationary portion and the second stationary portion. However, the stationary member may be formed of one component.

(12) In the above-described embodiments, the biasing member has a closed annular shape. However, the biasing member may have an unclosed annular shape.

(13) In the above-described embodiments, the spring portion of the biasing member is supported at the both ends. However, the spring portion of the biasing member may be supported at one end.

(14) In the above-described embodiments, the latch is supported at the both ends. However, the latch may be supported at one end.

(15) In the above-described embodiments, the number of latches is three. However, the number of latches may be one, two, or four or more.

(16) In the above-described embodiments, the touch panel pattern is a self-capacitive touch panel pattern, which is one type of projected capacitive touch panel pattern. However, the touch panel pattern may be a mutual capacitive touch panel pattern, which is one type of projected capacitive touch panel pattern. Furthermore, the planar shape of the touch electrodes included in the touch panel pattern is not limited to a rhombus and may be a rectangle, a circle, or a polygon having five or more sides.

(17) In the above-described embodiments, the touch panel pattern is a projected capacitive touch panel pattern. However, the touch panel pattern may be a surface capacitive touch panel pattern.

(18) In the above-described embodiments, the touch panel pattern is a capacitive touch panel pattern. However, the touch panel pattern may be a resistive film touch panel pattern, an optical touch panel pattern, or an ultrasonic touch panel pattern other than the capacitive touch panel pattern.

(19) In the above-described embodiments, the liquid crystal display device includes a cover glass. However, the cover glass may be eliminated from the liquid crystal display device. In such a case, the touch panel pattern is preferably mounted in the liquid crystal panel. Alternatively, a touch panel may be disposed on the front side of the liquid crystal panel and the touch panel may include the touch panel pattern.

(20) In the above-described embodiments, the input detecting device (liquid crystal display device) has a horizontally long rectangular planar shape. However, the planar shape of the input detecting device may be a vertically long rectangle, a square, an oval, an ellipse, a circle, a trapezoid, or a shape having a curved portion, for example.

(21) The specific use, for example, of the input detecting device is not limited to that in the above-described embodiments.

(22) In the above-described embodiments, the liquid crystal display device includes a liquid crystal panel as an input receiver. However, the display device may include another type of display panel (a plasma display panel (PDP), an organic EL panel, or an electrophoretic display panel (EPD), or a micro electromechanical system (MEMS) display panel) as the input receiver.

The invention claimed is:

1. An input detecting device comprising:
    a display device including a display surface including a display area displaying an image and a non-display area outside the display area, the display device including a touch panel pattern disposed in the display area; and
    a dial attached to the display device to protrude from a section of the display area of the display surface, the dial including:
    a stationary member having a cylindrical shape and being fixed to the display device, the stationary member being made of a non-conductive material;
    a rotary portion having a cylindrical shape and being attached to the stationary member to be rotatable relative to the stationary member and movable between a standby position spaced apart from the display surface and an advanced position closer than the standby position to the display surface, the rotary portion including a first rotary portion made of a conductive material and a second rotary portion made of a non-conductive material;
    a rotation detectable conductive plate attached to a first section of an outer periphery of the second rotary portion to be rotatable together with the rotary portion relative to the display surface so that a position of the rotation detectable conductive plate is detected by the touch panel pattern; and
    a push detectable conductive plate attached to a second section of the outer periphery of the second rotary portion to be movable together with the rotary portion between the standby position and the advanced position so that a position of the push detectable conductive plate is detected by the touch panel pattern;
    wherein the first rotary portion is rotatable relative to the stationary member and movable between the standby position and the advanced position; and the second rotary portion is rotatable together with the first rotary portion but not movable together with the first rotary portion between the standby position and the advance position.

2. The input detecting device according to claim 1, wherein
the rotation detectable conductive plate is electrically connected to the rotary portion, and
the push detectable conductive plate is electrically connected to the rotary portion.

3. The input detecting device according to claim 1, wherein the rotation detectable conductive plate includes a portion sticking out from the second rotary portion toward the display device and the second rotary portion includes a protrusion projecting toward the display device.

4. The input detecting device according to claim 1, further comprising a biasing member located between the first rotary portion and the second rotary portion to elastically bias the first rotary portion toward the standby position.

5. The input detecting device according to claim 1, wherein the second rotary portion includes a push detection elastic contact that is in elastic contact with the push detectable conductive plate when the first rotary portion is the advanced position.

6. The input detecting device according to claim 5, wherein the push detection elastic contact is out of contact with the push detectable conductive plate when the first rotary portion is at the standby position and is in elastic contact with the push detectable conductive plate when the first rotary portion is at the advanced position.

7. The input detecting device according to claim 1, wherein the second rotary portion includes a push detection elastic contact that is out of elastic contact with the push detectable conductive plate when the first rotary portion is at the advanced position and in elastic contact with the push detectable conductive plate when the first rotary portion is at the standby position.

8. The input detecting device according to claim 1, wherein the second rotary portion includes a rotation detection elastic contact that is in elastic contact with the rotation detectable conductive plate.

9. The input detecting device according to claim 1, wherein
the push detectable conductive plate includes a push detectable surface facing the display device and being detectable by the touch panel pattern,
the rotation detectable conductive plate includes a rotation detectable surface facing the display device and being detectable by the touch panel pattern, and
the push detectable surface and the rotation detectable surface have different sizes.

10. The input detecting device according to claim 9, wherein the push detectable conductive plate includes a plurality of the push detectable surfaces.

11. The input detecting device according to claim 1, further comprising a latch including a supporting portion fixed to the stationary member and an arm elastically deformable with the supporting portion as a fulcrum to be in contact with an inner periphery of the second rotary portion, wherein
the inner periphery of the second rotary portion includes recesses and protrusions alternately arranged in a rotation direction of the second rotary portion.

12. The input detecting device according to claim 11, wherein the stationary member includes a first stationary portion and a second stationary portion disposed such that the latch is sandwiched between the first stationary portion and the second stationary portion.

13. The input detecting device according to claim 1, wherein the first section and the second section of the outer periphery of the second rotary portion are separated from each other in a circumferential direction of the second rotary portion.

* * * * *